United States Patent
Homma

(10) Patent No.: US 6,943,959 B2
(45) Date of Patent: Sep. 13, 2005

(54) OBJECTIVE OPTICAL SYSTEM

(75) Inventor: Hiroyuki Homma, Sagamihara (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 10/879,086

(22) Filed: Jun. 30, 2004

(65) Prior Publication Data

US 2005/0030639 A1 Feb. 10, 2005

(30) Foreign Application Priority Data

Jul. 4, 2003 (JP) ........................................ 2003-192235

(51) Int. Cl.$^7$ .............................................. G02B 15/14
(52) U.S. Cl. ...................... 359/682; 359/676; 359/677; 359/687; 600/160; 600/168
(58) Field of Search ................. 359/682, 676, 359/677, 687, 681; 600/176, 160, 168

(56) References Cited

U.S. PATENT DOCUMENTS 6,160,669 A * 12/2000 Nagaoka ..................... 359/686

FOREIGN PATENT DOCUMENTS

JP 51-62053 5/1976
JP 1-279219 11/1989

* cited by examiner

Primary Examiner—Hung Xuan Dang
Assistant Examiner—Joseph Martinez
(74) Attorney, Agent, or Firm—Kenyon & Kenyon

(57) ABSTRACT

In a nearer order from its object, a first lens group which has a negative refractive power, a brightness diaphragm, and a second lens group which has a positive refractive power, and a moving lens group which moves on an optical axis, conditions such as $2 \leq D_L/f_W \leq 6$, and $-2 \leq D_{VH}/f_W \leq 0.37$ are satisfied under condition that $D_L$ (mm) indicates an air-converged length from an end surface near an image in the first lens group to an end surface nearer to an object in the moving lens group, $f_W$ (mm) indicates a focal length in an entire system in a wide angle end, $D_{VH}$ (mm) indicates a distance from the end surface near the object in the moving lens group to a front principal point. By doing this, it is possible to provide an objective optical system which can obtain a high magnification while securing a sufficient distance between the diaphragm which is disposed behind the optical axis direction converting element such as a prism to the moving lens group.

9 Claims, 16 Drawing Sheets

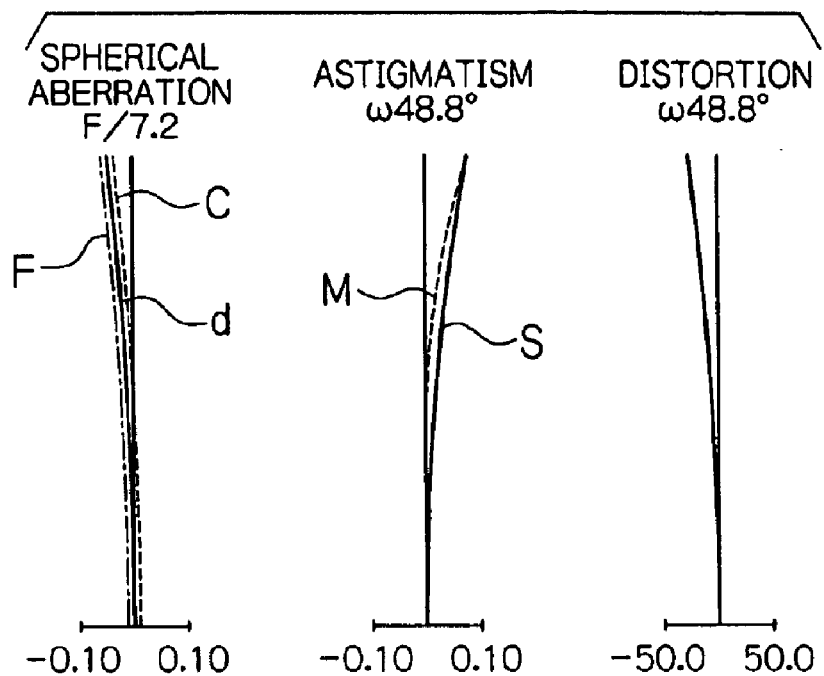
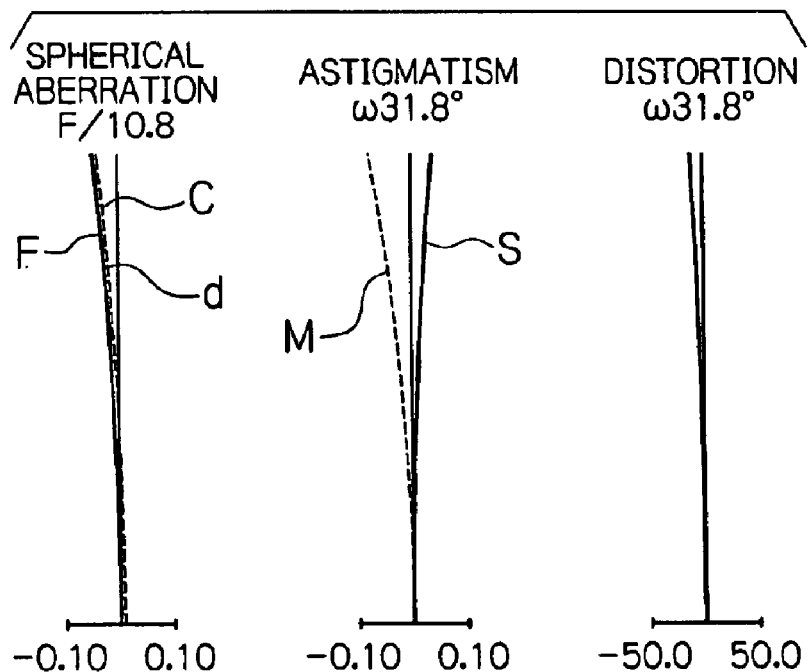

OBJECTIVE OPTICAL SYSTEM

The present application is based on patent application No. 2003-192235 filed Jul. 4, 2003 in Japan, the content of which are incorporated herein by reference.

BACKGROUND OF THE INVENTION

1. Field of the Invention

The present invention relates to an objective optical system which has a zooming function.

2. Description of Related Art

In general, medical endoscopes are used for their purposes. A first lens in an objective optical system is disposed in an end section of a tip and other lenses and an image-capturing element such as a CCD are disposed on an optical axis of the first lens in a linear manner in a direct view type endoscope. On the other hand, the first lens is disposed on a side section of a tip of the endoscope and an optical axis of this first lens is bent by a prism, etc., and other lenses and a CCD are disposed on a bent optical axis in a side-view type endoscope. Thus, these endoscopes are used separately according to purposes such as a point to where the endoscope is supposed to be inserted into a human body and a purpose of the medical examination.

It is required that an outer diameter of the endoscope should be as small as possible so as to alleviate a pain of a patient. In order to realize such a requirement, it is certainly necessary to reduce a size of an objective optical system.

In general, an optical axis direction converting element such as a prism, etc, is necessary for this side-view type endoscope. It is preferable that the optical axis direction converting element should be disposed near a first lens and diaphragm of which height of a light should be lower in order to prevent that a diameter of the endoscope may be reduced.

For such an objective optical system in this type of side-view type endoscope, an optical system is known which is described in Japanese Unexamined Patent Application, First Publication No. Sho 51-62053 in pages 2 to 6, FIGS. 1 to 9). In these embodiments each member are disposed as follows. A first lens group which has a negative refractive power is disposed nearest to the object. A prism is disposed second nearest to the object. A diaphragm is disposed third nearest to the object. A second lens group which has a positive refractive index is disposed the farthest to the object.

In addition, among the endoscopes, what is called a magnifying endoscope of which is purpose is to perform a diagnostic operation for a degree of a slight lesion and a range which is supposed to be executed by magnifying a lesion part and observing a fine structure is drawing attention. For such a side-view type objective optical system in this magnifying endoscope, an optical system is known which is described in Japanese Unexamined Patent Application, First Publication No. Hei 1-279219 is known (pages 4 to 8, FIGS. 1 to 4). In these embodiments, the first lens group which has negative refractive power is disposed nearest to the object. The diaphragm is disposed second nearest to the object. The moving lens group which has a positive refractive power is disposed the farthest from the object such that a focal point has the greatest proximity simultaneously when the focal length is longer; thus, an magnified view is obtained in a telephoto end because the moving lens group moves toward the diaphragm on the optical axis. That is, a lens system which performs a magnification and a focusing operation simultaneously in a single operation is realized.

In the above conventional objective optical system, a diameter of the lens in the objective optical system for the side-view type endoscope which is described in Japanese Unexamined Patent Application, First Publication No. Sho 51-62053 becomes great because a height of a ray in a moving lens group becomes high in a wide-angle end in which the moving lens group is disposed from the diaphragm in the farthest distance. Nonetheless, in any cases, the moving lens group approaches the optical axis direction converting element and a diaphragm at the telephoto end.

Also, a prism is disposed between the first lens group and the moving lens group in the objective optical system of the side-view type endoscope which is described in the Japanese Unexamined Patent Application, First Publication No. Hei 1-279219. The image-capturing element such as a CCD in a side-view type electronic endoscope is necessary to be contained sufficiently within an outer wall of the endoscope not at an edge of the outer wall because of securing a strength therein. Therefore, an optical axis of the first lens which is bent by the optical axis direction converting element is necessary to be disposed sufficiently inside of the endoscope. Also, an inner diameter of a lens barrel in which a lens behind the diaphragm is supposed to be contained is necessary to be small by a certain distance because there is a frame for receiving the first lens from a structural point of view of the mirror frame.

SUMMARY OF THE INVENTION

The present invention provides an objective optical system which can obtain a high magnification while securing a sufficient distance between the diaphragm which is disposed behind the optical axis direction converting element such as a prism to the moving lens group.

This present invention adapts following sections for solving the above problem.

In an objective optical system in a first aspect of the present invention which is provided with, in a nearer order from its object, a first lens group which has a negative refractive power, a brightness diaphragm, and a second lens group which has a positive refractive power, and a moving lens group which moves on an optical axis, conditions such as $2 \leq D_L/f_W \leq 6$, and $-2 \leq D_{VH}/f_W \leq 0.37$ are satisfied under condition that $D_L$ (mm) indicates an air-converged length from an end surface near an image in the first lens group to an end surface nearer to an object in the moving lens group, $f_W$ (mm) indicates a focal length in an entire system in a wide angle end, $D_{VH}$ (mm) indicates a distance from the end surface near the object in the moving lens group to a front principal point.

In the present invention, back focus between the end surface near an image in the first lens group and the end surface near an object in the movable lens group is indicated by $D_L$ (mm), a focal length in an entire system at the wide-angle end is indicated by $f_W$ (mm), and a distance between the end surface near an object in the movable lens group and the front principal point is indicated by $D_{VH}$ (mm); thus, a condition such as $2 \leq D_L/f_W \leq 6$ is satisfied. Therefore, a sufficient distance is obtained at the telephoto end in which a distance between the first lens group and the movable lens group is the closest. By doing this, an optical axis direction converting element is disposed even at the telephoto end of the movable lens group; thus, a sufficient distance can be realized even in a small frame in which a diameter near the diaphragm is small.

However, if the $D_L/f_W$ is smaller than 2, it is not possible to secure a space for containing a frame in which the optical axis direction converting element and the diaphragm of which diameters are small therearound. Also, if the $D_L/f_W$ is greater than 6, an unnecessary space exists which exceeds the above space. Therefore, an entire length of the optical system is long unnecessarily. Furthermore, a diameter of the second lens group is great undesirably.

Also, if a condition such as $-2 \leq D_{VH}/f_W \leq 0.37$ is satisfied and there exists quite a distance between the first lens group and the movable lens group, the position of the front principal point of the movable lens is disposed approximately the same position as the end surface near an object of the moving lens group or frontmore there. Therefore, a magnification at the telephoto end is great.

Here, in a basic structure, an entire moving lens group in the objective optical system according to the present invention has a positive refractive power so as to increase the magnification at the telephoto end such that the first lens group has a negative refractive power and the second lens group has a positive refractive power. By doing this, a position of the front principal point of the moving lens group is disposed approximately the same as the end surface near an object or frontmore there.

However, if $D_{VH}/f_W$ is smaller than $-2$, the negative refractive power in the moving lens group is too great; thus, a back focus is long. Therefore, an entire length of the optical system is long. Also, if $D_{VH}/f_W$ is greater than 0.37, it is difficult to increase the magnification at the telephoto end.

An objective optical system according to a second aspect of the present invention is characterized in that, according to the first aspect of the present invention, the focal length $f_V$ (mm) of the moving lens group satisfies a condition such as $2.5 \leq f_V/f_W \leq 4$ According to the present invention, the focal length $f_V$ of the moving lens group satisfies a condition such as $2.5 \leq f_V/f_W \leq 4$; therefore, the entire length of the objective optical system is shortened while obtaining a magnification at the telephoto end.

However, if $f_V/f_W$ is smaller than 2.5, a back focus is too short to obtain an interval for adjusting a focus sufficiently. Also, if $f_V/f_W$ is greater than 4, an entire length of the objective optical system is long.

In an objective optical system of the second aspect of the present invention, a third aspect of the present invention is characterized in that a magnification $\beta_{VT}$ in an telephoto end of the moving lens group satisfies a condition such as $-1.2 \leq \beta_{VT} \leq -0.83$.

According to the present invention, the magnification $\beta_{VT}$ in an telephoto end of the moving lens group satisfies a condition such as $-1.2 \leq \beta_{VT} \leq 0.83$. By doing this, a sufficient optical magnification can be obtained at the telephoto end to which the distance to the object is the closest.

However, if the magnification $\beta_{VT}$ is smaller than $-1.2$, the distance to the object is more separated; thus, a magnification in an entire system is small. Also, if the magnification $\beta_{VT}$ is greater than $-0.83$, the magnification at the telephoto end of the moving lens group is small; thus, it is not possible to obtain a sufficient magnification in an entire system.

In an objective optical system according to the third aspect, a fourth aspect of the present invention is characterized in that the moving lens group is provided with, in an order from nearer the object, at least a lens which has a positive refractive power and a lens which has a negative refractive power.

According to the present invention, the moving lens group is provided with a lens which has at least a positive refractive power and a lens which has a negative refractive power in an order such that the lens which has the positive refractive power is disposed nearest to the tip section. Therefore, the moving lens group is disposed in an approximate telephoto manner; thus, the position of the front principal point is fed forwardly. Thus, it is possible to realize a high magnification at the telephoto end.

In an objective optical system according to the fourth aspect, a fifth aspect of the present invention is characterized in that the moving lens group has another lens which has a positive refractive power between the lens which has positive refractive power and the lens which has negative refractive power.

According to the present invention, the moving lens group has another lens which has a positive refractive power between the lens which has positive refractive power and the lens which has negative refractive power. Therefore, in a structural point of view, the moving lens group is disposed in an approximate telephoto manner such that the position of the front principal point is fed forwardly. Simultaneously, it is possible to share the refractive power by two lenses which has a positive refractive power. Thus, it is possible to increase a flexibility in a lens design for correcting aberrations.

In the objective optical system according to the fifth aspect, a sixth aspect of the present invention is characterized in that the air-converged length $D_A$ (mm) from the end surface near an image of the first lens group to a position of the diaphragm satisfies a condition such as $1.674$ (mm) $\leq D_A \leq 4$ (mm).

According to the present invention, the air-converged length $D_A$ (mm) from the end surface near an image of the first lens group to a position of the diaphragm satisfies a condition such as $1.674$ (mm) $\leq D_A \leq 4$ (mm). Therefore, a space in which the optical axis direction converting element is inserted is obtained. Thus, even if the image-capturing element such as a CCD is downsized and then a height of an image in the image-capturing element is small, the optical axis of that lens which has the positive refractive power bent by the optical axis direction converting element can be formed inside of the endoscope.

However, if $D_A$ (mm) is smaller than 1.674 (mm), it is not possible to obtain a space in which the optical axis direction converting element is inserted. Also, if $D_A$ (mm) is greater than 4 (mm), an excessive space is obtained in a space in which the optical axis direction converting element is inserted; thus, such an excessive space affects a specification for an outer shape of the endoscope undesirably.

In the sixth aspect of the objective optical system, a seventh aspect of the present invention is characterized in that an infra-red-ray-cutting filter is disposed between the diaphragm and the moving lens group.

According to the present invention, an infra-red-ray-cutting filter is disposed between the diaphragm and the moving lens group; thus, an infra-red ray can be blocked while shortening an entire length of the objective optical system.

In the seventh aspect of the objective optical system, an eighth aspect of the present invention is characterized in that a focal length $f_T$ (mm) in an entire system at a telephoto end satisfies a condition such as $2(1/\text{mm}) \leq D_L/(f_W \cdot f_T) \leq 4(1/\text{mm})$.

According to the present invention, a focal length $f_T$ (mm) in an entire system at a telephoto end satisfies a condition such as $2(1/mm) \leq D_L/(f_W \cdot f_T) \leq 4(1/mm)$. Therefore, the first lens group and the moving lens group approach with each other at the telephoto end; thus, the focal length in an entire system at the telephoto end is great. Therefore, it is possible to obtain a greater magnification more easily.

However, if $D_L/(f_W \cdot f_T)(1/mm)$ is smaller than $2(1/mm)$, it is not possible to obtain a space in which an optical axis direction converting element or the frame which has small diameter near the diaphragm should be disposed. Also, if $D_L/(f_W \cdot f_T)(1/mm)$ is greater than $4(1/mm)$, it is not possible to obtain a magnification at the telephoto end.

In the eighth aspect of the objective optical system, a ninth aspect of the present invention is characterized in that a prism is disposed between the first lens group and the diaphragm.

According to the present invention, a prism is disposed between the first lens group and the diaphragm. Thus, it is possible to perform a handling operation such as an assembly and a form modification for the prism easily. Therefore, it is possible to realize an objective optical system which is not costly.

BRIEF DESCRIPTION OF THE DRAWINGS

FIG. 1A is a cross section at the wide-angle end. FIG. 1B is a cross section at the telephoto end.

FIG. 4A is a cross section at the wide-angle end. FIG. 4B is a cross section at the telephoto end.

FIG. 7A is a cross section at the wide-angle end. FIG. 7B is a cross section at the telephoto end.

FIG. 10A is a cross section at the wide-angle end. FIG. 10B is a cross section at the telephoto end.

FIG. 11 is an aberration curve at the wide-angle end in the objective optical system according to the embodiment 4 according to the present invention.

FIG. 12 is an aberration curve at the telephoto end in the objective optical system according to the embodiment 4 according to the present invention.

FIG. 13A is a cross section at the wide-angle end. FIG. 13B is a cross section at the telephoto end.

FIG. 16A is a cross section at the wide-angle end. FIG. 16B is a cross section at the telephoto end.

FIG. 19A is a cross section at the wide-angle end. FIG. 19B is a cross section at the telephoto end.

DETAILED DESCRIPTION OF THE INVENTION

Figure 1A:
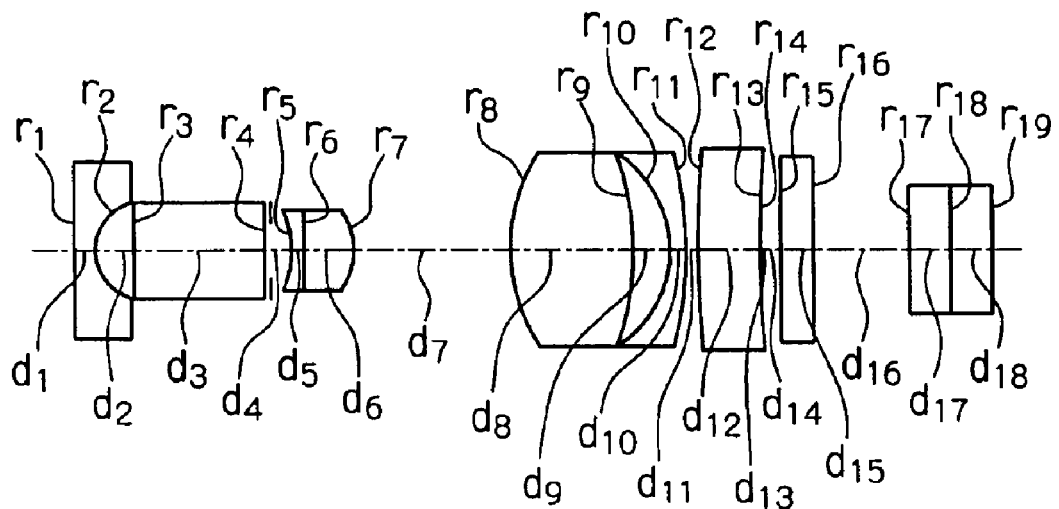
FIGS. 1A and 1B are cross sections for an objective optical system according to an embodiment 1 according to the present invention.

Next, embodiments for the objective optical system according to the present invention are explained with reference to examples as follows.

TABLE 1

Embodiment 1

| | | | |
|---|---|---|---|
| r1 = ∞ | d1 = 0.2868 | n1 = 1.883 | ν1 = 40.76 |
| r2 = 0.7535 | d2 = 0.5593 | | |
| r3 = ∞ | d3 = 1.9728 | n2 = 1.8061 | ν2 = 40.92 |
| r4 = ∞ | d4 = 0.3944 | | |
| r5 = −1.8851 | d5 = 0.1793 | n3 = 1.69895 | ν3 = 30.13 |
| r6 = ∞ | d6 = 0.7171 | n4 = 1.51633 | ν4 = 64.14 |
| r7 = −1.3432 | d7= D1 (Variable) | | |
| r8 = 2.5757 | d8 = 1.7927 | n5 = 1.755 | ν5 = 52.32 |
| r9 = −3.8567 | d9 = 0.5737 | | |

TABLE 1-continued

Embodiment 1

| | | | |
|---|---|---|---|
| r10 = −1.6457 | d10 = 0.2868 | n6 = 1.69895 | ν6 = 30.13 |
| r11 = −4.7739 | d11 = 0.1793 | | |
| r12 = 32.9057 | d12 = 0.8605 | n7 = 1.72916 | ν7 = 54.68 |
| r13 = 9.6042 | d13 = 0.0717 | | |
| r14 = ∞ | d14 = D2 (Variable) | | |
| r15 = ∞ | d15 = 0.4446 | n8 = 1.514 | ν8 = 75 |
| r16 = ∞ | d16 = 1.4342 | | |
| r17 = ∞ | d17 = 0.5737 | n9 = 1.51633 | ν9 = 64.14 |
| r18 = ∞ | d18 = 0.5737 | n10 = 1.52 | ν10 = 64.1 |
| r19 = ∞ | | | |
| f | 1.000 | 1.467 | |
| D0 | 13.194 | 1.721 | |
| D1 | 2.233 | 0.359 | |
| D2 | 0.272 | 2.147 | |
| $D_L/f_W = 2.983$, $D_{VH}/f_W = -1.114$, $f_V/f_W = 3.444$, | | | |
| $\beta_{VT} = -1.15$, $D_A = 1.652$, $D_L/(f_W \cdot f_T) = 2.033$ | | | |

TABLE 2

Embodiment 2

| | | | |
|---|---|---|---|
| r1 = ∞ | d1 = 0.2725 | n1 = 1.883 | ν1 = 40.76 |
| r2 = 0.8433 | d2 = 0.5313 | | |
| r3 = ∞ | d3 = 5.6221 | n2 = 1.8061 | ν2 = 40.92 |
| r4 = ∞ | d4 = 0.3747 | | |
| r5 = 10.4346 | d5 = 0.1703 | n3 = 1.69895 | ν3 = 30.13 |
| r6 = ∞ | d6 = 0.6812 | n4 = 1.51633 | ν4 = 64.14 |
| r7 = −28.4076 | d7 = D1 (Variable) | | |
| r8 = 2.2975 | d8 = 1.7029 | n5 = 1.755 | ν5 = 52.32 |
| r9 = −4.4762 | d9 = 0.5449 | | |
| r10 = −1.5633 | d10 = 0.2725 | n6 = 1.69895 | ν6 = 30.13 |
| r11 = −4.5349 | d11 = 0.1703 | | |
| r12 = 10.6392 | d12 = 0.8174 | n7 = 1.72916 | ν7 = 54.68 |
| r13 = 3.9362 | d13 = 0.0681 | | |
| r14 = ∞ | d14 = D2 (Variable) | | |
| r15 = ∞ | d15 = 0.4223 | n8 = 1.514 | ν8 = 75 |
| r16 = ∞ | d16 = 1.3623 | | |
| r17 = ∞ | d17 = 0.5449 | n9 = 1.51633 | ν9 = 64.14 |
| r18 = ∞ | d18 = 0.5449 | n10 = 1.52 | ν10 = 64.1 |
| r19 = ∞ | | | |
| f | 1.000 | 1.236 | |
| D0 | 12.534 | 1.635 | |
| D1 | 1.418 | 0.341 | |
| D2 | 0.258 | 1.336 | |
| $D_L/f_W = 4.910$, $D_{VH}/f_W = -1.788$, $f_V/f_W = 3.365$, | | | |
| $\beta_{VT} = -0.939$, $D_A = 3.89$, $D_L/(f_W \cdot f_T) = 3.972$ | | | |

TABLE 3

Embodiment 3

| | | | |
|---|---|---|---|
| r1 = ∞ | d1 = 0.3053 | n1 = 1.883 | ν1 = 40.76 |
| r2 = 1.1448 | d2 = 0.5953 | | |
| r3 = ∞ | d3 = 2.8619 | n2 = 1.8061 | ν2 = 40.92 |
| r4 = ∞ | d4 = 0.4198 | | |
| r5 = −2.0996 | d5 = 0.1908 | n3 = 1.69895 | ν3 = 30.13 |
| r6 = ∞ | d6 = 0.7632 | n4 = 1.51633 | ν4 = 64.14 |
| r7 = −1.8687 | d7 = D1 (Variable) | | |
| r8 = 3.6692 | d8 = 1.9079 | n5 = 1.755 | ν5 = 52.32 |
| r9 = −2.8708 | d9 = 0.6105 | | |
| r10 = −1.7515 | d10 = 0.3053 | n6 = 1.69895 | ν6 = 30.13 |
| r11 = −5.0808 | d11 = 0.1908 | | |
| r12 = 8.6695 | d12 = 0.9158 | n7 = 1.72916 | ν7 = 54.68 |
| r13 = −53.644 | d13 = 0.0763 | | |
| r14 = ∞ | d14 = D2 (Variable) | | |
| r15 = ∞ | d15 = 0.4732 | n8 = 1.514 | ν8 = 75 |
| r16 = ∞ | d16 = 1.5263 | | |
| r17 = ∞ | d17 = 0.6105 | n9 = 1.51633 | ν9 = 64.14 |
| r18 = ∞ | d18 = 0.6105 | n10 = 1.52 | ν10 = 64.1 |
| r19 = ∞ | | | |
| f | 1.000 | 1.293 | |
| D0 | 14.000 | 1.830 | |

TABLE 3-continued

Embodiment 3

| | | |
|---|---|---|
| D1 | 1.530 | 0.382 |
| D2 | 0.289 | 1.423 |
| $D_L/f_W = 3.215$, $D_{VH}/f_W = 0.386$, $f_V/f_W = 3.25$, | | |
| $\beta_{VT} = -0.661$, $D_A = 2.18$, $D_L/(f_W \cdot f_T) = 2.486$ | | |

TABLE 4

Embodiment 4

| | | | |
|---|---|---|---|
| r1 = ∞ | d1 = 0.2883 | n1 = 1.883 | ν1 = 40.76 |
| r2 = 1.081 | d2 = 0.5621 | | |
| r3 = ∞ | d3 = 2.7024 | n2 = 1.8061 | ν2 = 40.92 |
| r4 = ∞ | d4 = 0.3963 | | |
| r5 = −1.4938 | d5 = 0.1802 | n3 = 1.69895 | ν3 = 30.13 |
| r6 = ∞ | d6 = 0.7206 | n4 = 1.51633 | ν4 = 64.14 |
| r7 = −1.3784 | d7 = D1 (Variable) | | |
| r8 = 3.4951 | d8 = 1.8016 | n5 = 1.755 | ν5 = 52.32 |
| r9 = −3.1732 | d9 = 0.5765 | | |
| r10 = −1.8835 | d10 = 0.2883 | n6 = 1.7552 | ν6 = 27.51 |
| r11 = −4.5297 | d11 = 0.1802 | | |
| r12 = 9.1589 | d12 = 0.8648 | n7 = 1.72916 | ν7 = 54.68 |
| r13 = 28.4186 | d13 = 0.0721 | | |
| r14 = ∞ | d14 = D2 (Variable) | | |
| r15 = ∞ | d15 = 0.4468 | n8 = 1.514 | ν8 = 75 |
| r16 = ∞ | d16 = 1.8662 | | |
| r17 = ∞ | d17 = 0.5765 | n9 = 1.51633 | ν9 = 64.14 |
| r18 = ∞ | d18 = 0.5765 | n10 = 1.52 | ν10 = 64.1 |
| r19 = ∞ | | | |
| f | 1.000 | 1.338 | |
| D0 | 13.260 | 1.600 | |
| D1 | 1.747 | 0.360 | |
| D2 | 0.273 | 1.660 | |
| $D_L/f_W = 3.396$, $D_{VH}/f_W = 0.094$, $f_V/f_W = 3.364$, | | | |
| $\beta_{VT} = -1.047$, $D_A = 2.076$, $D_L/(f_W \cdot f_T) = 2.538$ | | | |

TABLE 5

Embodiment 5

| | | | |
|---|---|---|---|
| r1 = ∞ | d1 = 0.2536 | n1 = 1.883 | ν1 = 40.76 |
| r2 = 0.8284 | d2 = 0.4945 | | |
| r3 = ∞ | d3 = 2.6161 | n2 = 1.8061 | ν2 = 40.92 |
| r4 = ∞ | d4 = 0.3487 | | |
| r5 = −3.6473 | d5 = 0.1585 | n3 = 1.69895 | ν3 = 30.13 |
| r6 = ∞ | d6 = 0.6339 | n4 = 1.51633 | ν4 = 64.14 |
| r7 = −1.8499 | d7 = D1 (Variable) | | |
| r8 = 2.8793 | d8 = 1.5848 | n5 = 1.755 | ν5 = 52.32 |
| r9 = −2.4945 | d9 = 0.5071 | | |
| r10 = −1.4549 | d10 = 0.2536 | n6 = 1.69895 | ν6 = 30.13 |
| r11 = −4.2204 | d11 = 0.1585 | | |
| r12 = 9.1960 | d12 = 0.7607 | n7 = 1.72916 | ν7 = 54.68 |
| r13 = 6.3856 | d13 = 0.0634 | | |
| r14 = ∞ | d14 = D2 (Variable) | | |
| r15 = ∞ | d15 = 0.393 | n8 = 1.514 | ν8 = 75 |
| r16 = ∞ | d16 = 1.2679 | | |
| r17 = ∞ | d17 = 0.5071 | n9 = 1.51633 | ν9 = 64.14 |
| r18 = ∞ | d18 = 0.5071 | n10 = 1.52 | ν10 = 64.1 |
| r19 = ∞ | | | |
| f | 1.000 | 1.171 | |
| D0 | 11.660 | 1.521 | |
| D1 | 1.172 | 0.317 | |
| D2 | 0.240 | 1.096 | |
| $D_L/f_W = 3.12$, $D_{VH}/f_W = -0.607$, $f_V/f_W = 3.04$, | | | |
| $\beta_{VT} = -0.83$, $D_A = 1.943$, $D_{VH}/(f_W \cdot f_T) = 2.665$ | | | |

TABLE 6

Embodiment 6

| | | | |
|---|---|---|---|
| r1 = ∞ | d1 = 0.2932 | n1 = 1.883 | ν1 = 40.76 |
| r2 = 1.0096 | d2 = 0.5718 | | |
| r3 = ∞ | d3 = 2.7489 | n2 = 1.8061 | ν2 = 40.92 |

TABLE 6-continued

Embodiment 6

| | | | |
|---|---|---|---|
| r4 = ∞ | d4 = 0.4032 | | |
| r5 = −2.2039 | d5 = 0.1833 | n3 = 1.69895 | v3 = 30.13 |
| r6 = 2.7254 | d6 = 0.6554 | n4 = 1.51633 | v4 = 64.14 |
| r7 = −1.5272 | d7 = D1 (Variable) | | |
| r8 = 3.4418 | d8 = 0.7563 | n5 = 1.755 | v5 = 52.32 |
| r9 = −26.2887 | d9 = 0.1008 | | |
| r10 = 28.9463 | d10 = 0.7059 | n6 = 1.755 | v6 = 52.32 |
| r11 = −3.2645 | d11 = 0.5864 | | |
| r12 = −1.8151 | d12 = 0.2932 | n7 = 1.84666 | v7 = 23.78 |
| r13 = −3.9431 | d13 = 0.1833 | | |
| r14 = ∞ | d14 = D2 (Variable) | | |
| r15 = ∞ | d15 = 0.4545 | n8 = 1.514 | v8 = 75 |
| r16 = ∞ | d16 = 1.9977 | | |
| r17 = ∞ | d17 = 0.5864 | n9 = 1.51633 | v9 = 64.14 |
| r18 = ∞ | d18 = 0.5864 | n10 = 1.52 | v10 = 64.1 |
| r19 = ∞ | | | |
| f | 1.000 | 1.445 | |
| D0 | 13.5 | 1.8 | |
| D1 | 2 | 0.37 | |
| D2 | 0.28 | 1.92 | |
| $D_L/f_W = 3.404$, $D_{VH}/f_W = -0.184$, $f_V/f_W = 3.211$, | | | |
| $\beta_{VT} = -1.135$, $D_A = 2.094$, $D_{VH}/(f_W \cdot f_T) = 2.356$ | | | |

TABLE 7

Embodiment 7

| | | | |
|---|---|---|---|
| r1 = ∞ | d1 = 0.2798 | n1 = 1.883 | v1 = 40.76 |
| r2 = 1.0493 | d2 = 0.5456 | | |
| r3 = ∞ | d3 = 2.6232 | n2 = 1.8061 | v2 = 40.92 |
| r4 = ∞ | d4 = 0.3848 | | |
| r5 = −1.2304 | d5 = 0.5774 | n3 = 1.69895 | v3 = 30.13 |
| r6 = −1.3925 | d6 = 0.0962 | n4 = 1.515 | v4 = 75 |
| r7 = ∞ | d7 = 0.5774 | | |
| r8 = ∞ | d8 = D1 (Variable) | n5 = 1.755 | v5 = 52.32 |
| r9 = 3.3268 | d9 = 0.7217 | | |
| r10 = −10.9735 | d10 = 0.0962 | n6 = 1.755 | v6 = 52.32 |
| r11 = −42.8474 | d11 = 0.6736 | | |
| r12 = 2.9220 | d12 = 0.5596 | n7 = 1.7552 | v7 = 27.51 |
| r13 = −1.6054 | d13 = 0.2798 | | |
| r14 = −4.4014 | d14 = 0.1749 | | |
| r15 = ∞ | d15 = D2 (Variable) | n8 = 1.514 | v8 = 75 |
| r16 = ∞ | d16 = 0.4337 | | |
| r17 = ∞ | d17 = 1.339 | n9 = 1.51633 | v9 = 64.14 |
| r18 = ∞ | d18 = 0.5596 | n10 = 1.52 | v10 = 64.1 |
| r19 = ∞ | d19 = 0.5596 | | |
| r20 = ∞ | | | |
| f | 1.0 | 1.4088 | |
| D0 | 12.9 | 1.7 | |
| D1 | 1.869 | 0.35 | |
| D2 | 0.925 | 2.445 | |
| $D_L/f_W = 5.069$, $D_{VH}/f_W = -0.332$, $f_V/f_W = 3.170$, | | | |
| $\beta_{VT} = -1.120$, $D_A = 1.998$, $D_{VH}/(f_W \cdot f_T) = 3.598$ | | | |

Here, radius of curvature is indicated by r1, r2, . . . . Thickness of each lens and interval of lenses are indicated by d1, d2, . . . . Refractive indices for each lens are indicated by n1, n2, . . . . Abbe number is indicated by v1, v2, . . . . A distance to an object is indicated by D0. A unit for length is indicated by mm in data.

EXAMPLE 1

Figure 1B:
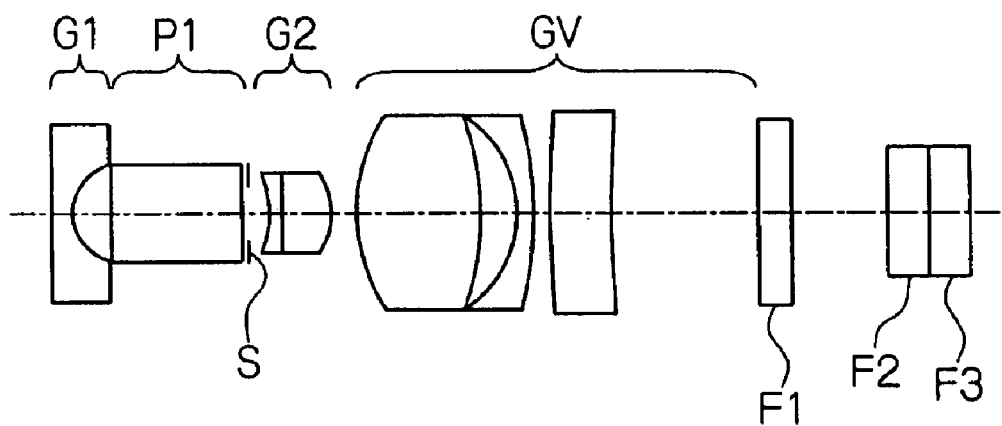

A structure for an example 1 is shown in FIGS. 1A and 1B. A wide-angle end is shown in FIG. 1A. A telephoto end is shown in FIG. 1B. This example 1, as shown in the drawing, is formed by a first lens group G1 which has a negative refractive power, an optical axis direction converting element P1, a second lens group G2 which has a positive refractive power, and a moving lens group GV which has a positive refractive power such that the first lens group is disposed nearest to the object and the moving lens group GV is disposed the farthest from the object.

Figure 2:
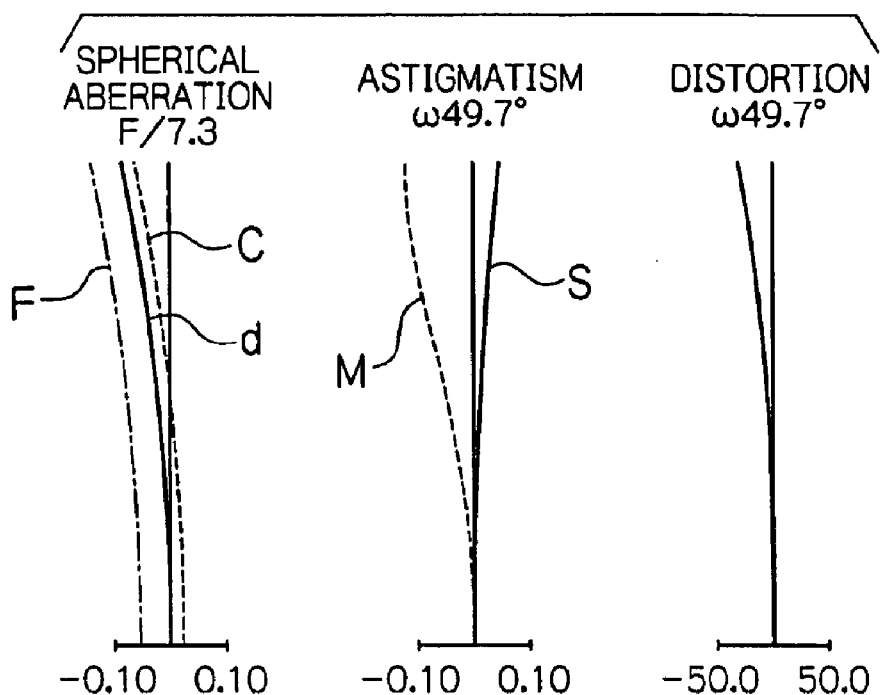
FIG. 2 is an aberration curve at the wide-angle end in the objective optical system according to the embodiment 1 according to the present invention.
Figure 3:
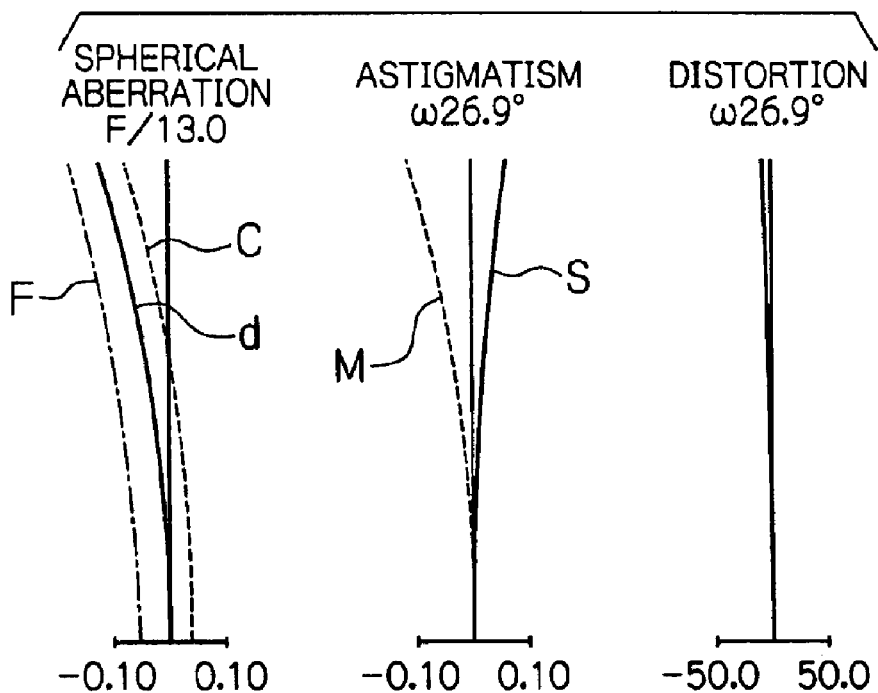
FIG. 3 is an aberration curve at the telephoto end in the objective optical system according to the embodiment 1 according to the present invention.

The first lens group G1 is formed by a negative single lens. The second lens group G2 is formed by a cemented lens which is formed by a negative lens and a positive lens such that the negative lens is disposed nearest to the object and the positive lens is disposed the farthest from the object. The moving lens group GV is formed by a positive single lens, a negative single lens, and a positive single lens such that the positive single lens is disposed nearest to the object and the positive single lens is disposed farthest from the object. A filter F1 which is disposed therebehind serves for cutting an infra-red range. F2 to F3 indicate filters, etc., which are disposed in front of an image-capturing surface of the image-capturing element. The diaphragm S is disposed behind the optical axis direction converting element. FIGS. 2 and 3 show aberrations at the wide-angle end and the telephoto end under such conditions. It is understood that aberrations are corrected desirably.

EXAMPLE 2

Figure 4A:
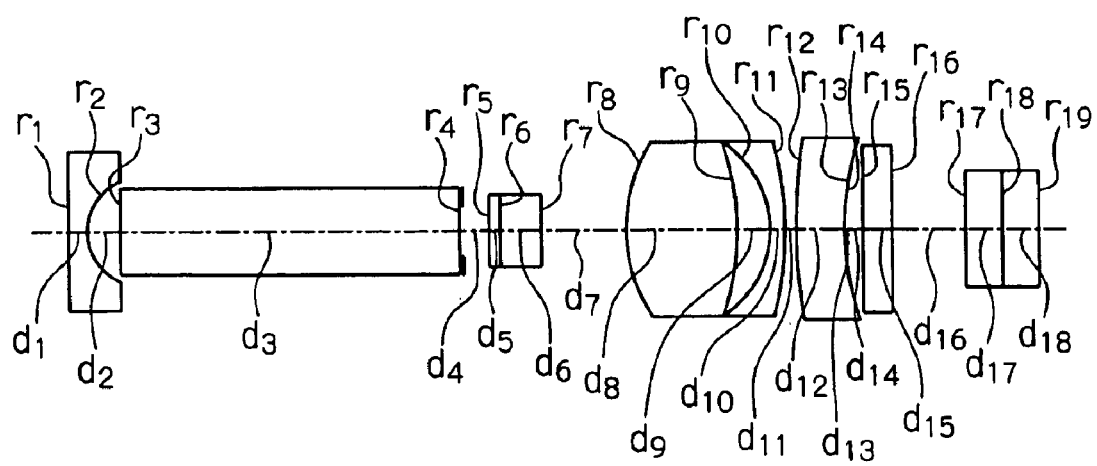
FIGS. 4A and 4B are cross sections for an objective optical system according to an embodiment 2 according to the present invention.
Figure 4B:
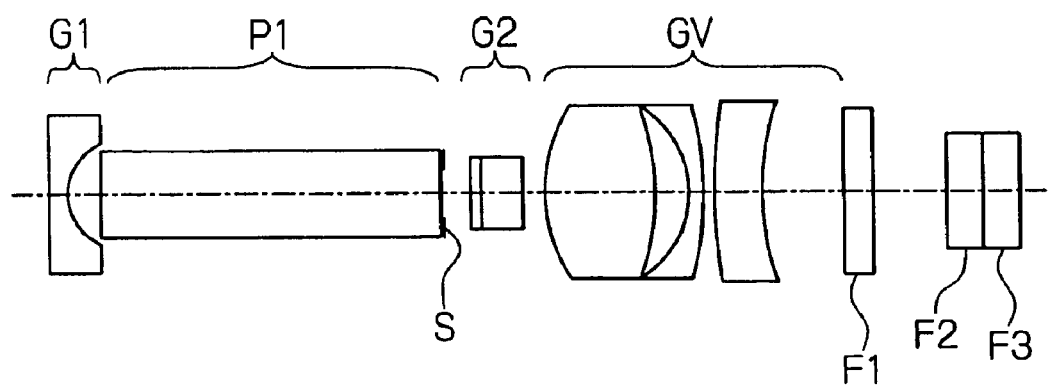
Figure 5:
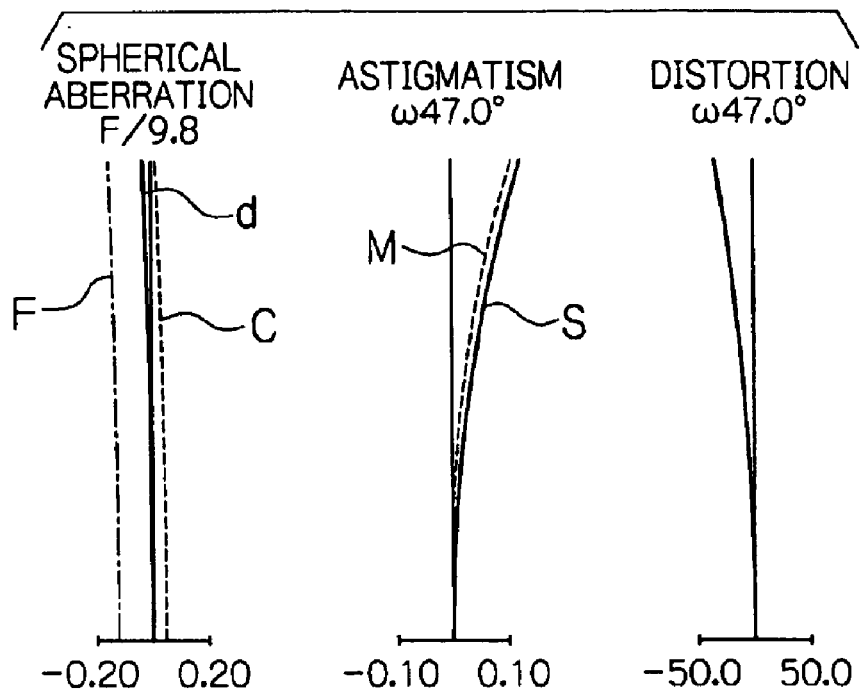
FIG. 5 is an aberration curve at the wide-angle end in the objective optical system according to the embodiment 2 according to the present invention.
Figure 6:
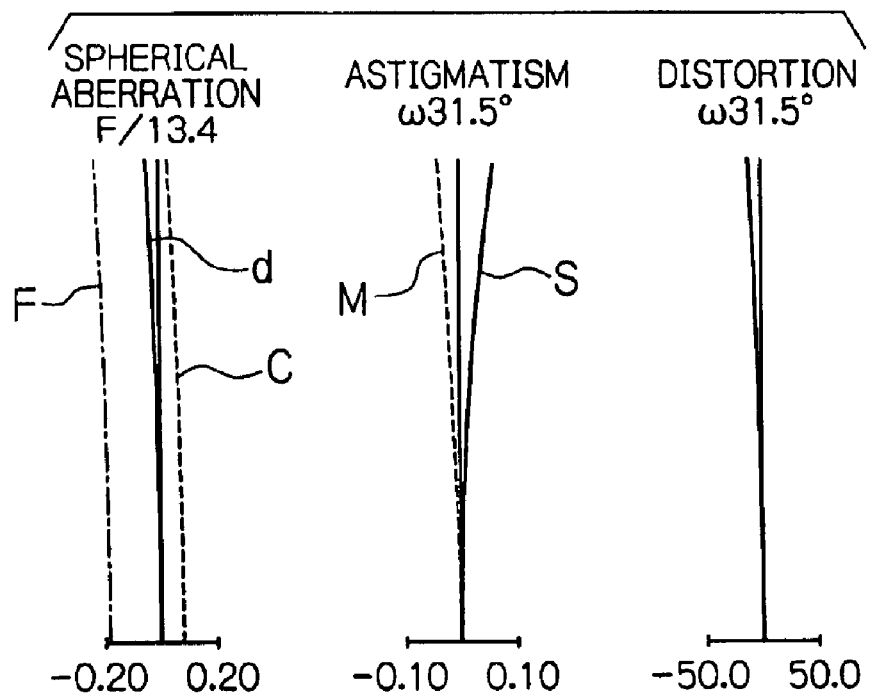
FIG. 6 is an aberration curve at the telephoto end in the objective optical system according to the embodiment 2 according to the present invention.

A structure for an example 2 is shown in FIGS. 4A and 4B. A wide-angle end is shown in FIG. 4A. A telephoto end is shown in FIG. 4B. Basic structure for lenses are the same as that in the example 1. FIGS. 5 and 6 show aberrations at the wide-angle end and the telephoto end under such conditions. It is understood that aberrations are corrected desirably.

EXAMPLE 3

Figure 7A:
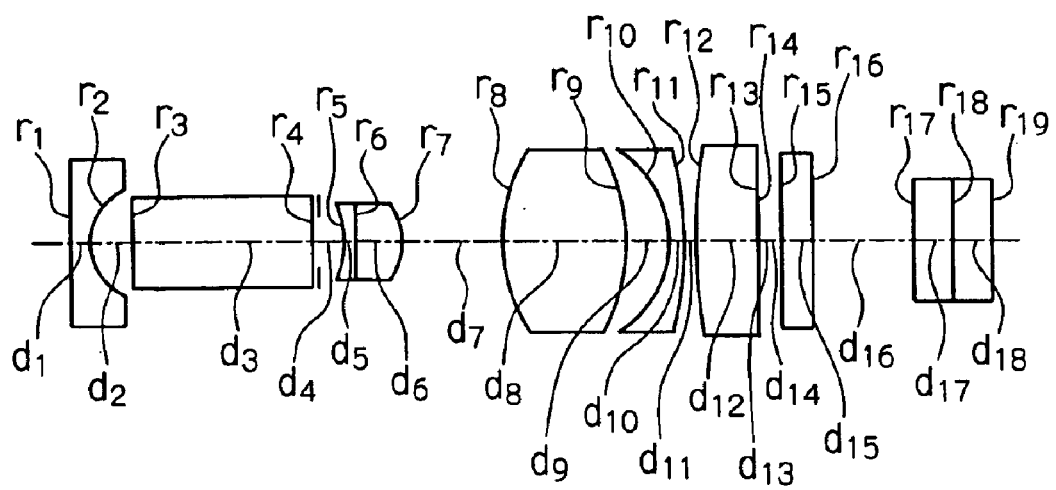
FIGS. 7A and 7B are cross sections for an objective optical system according to an embodiment 3 according to the present invention.
Figure 7B:
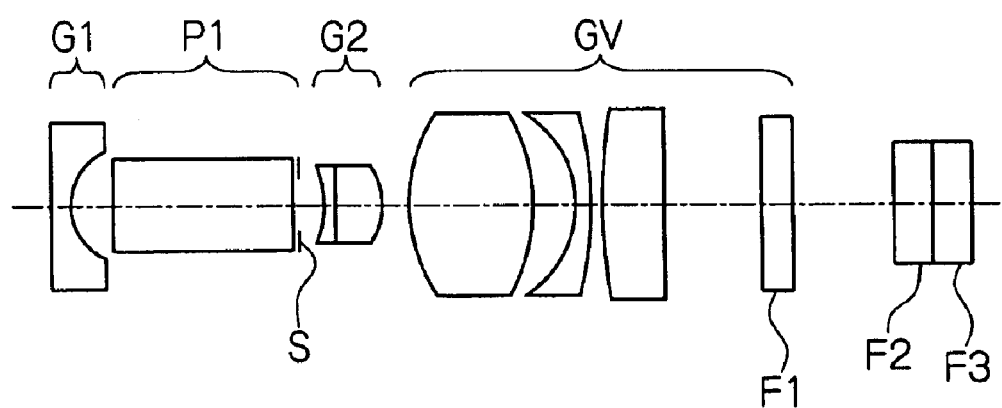
Figure 8:
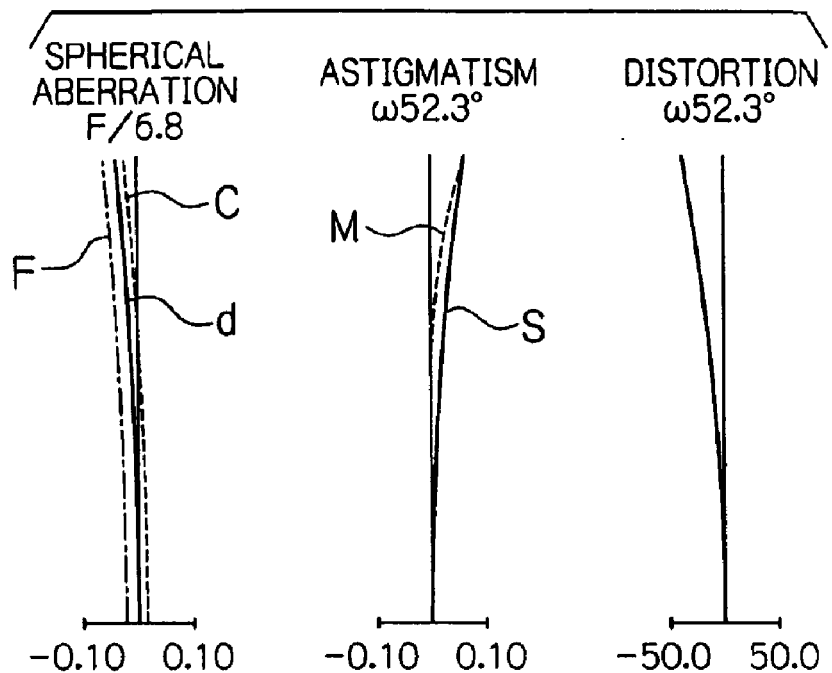
FIG. 8 is an aberration curve at the wide-angle end in the objective optical system according to the embodiment 3 according to the present invention.
Figure 9:
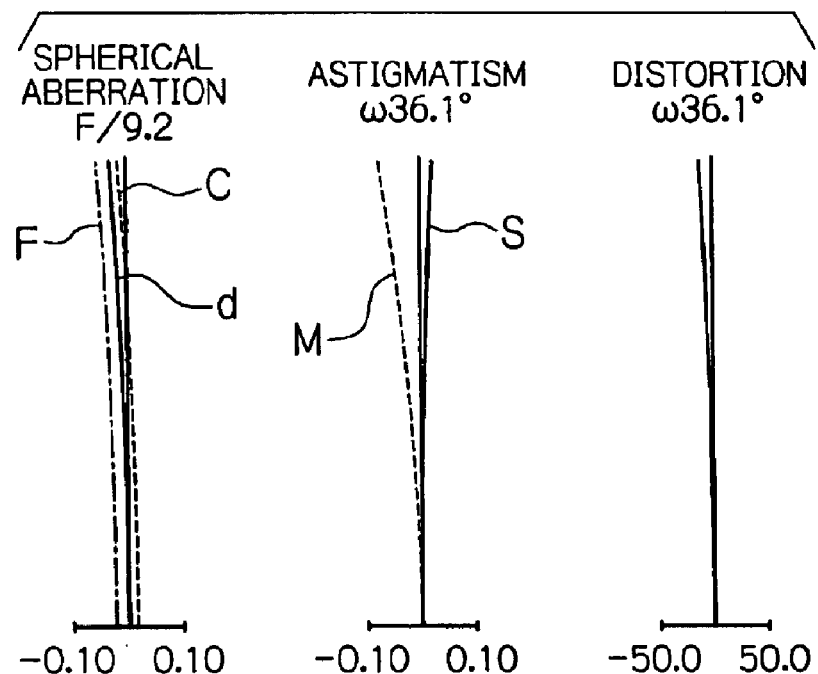
FIG. 9 is an aberration curve at the telephoto end in the objective optical system according to the embodiment 3 according to the present invention.

A structure for an example 3 is shown in FIGS. 7A and 7B. A wide-angle end is shown in FIG. 7A. A telephoto end is shown in FIG. 7B. Basic structure for lenses are the same as that in the example 1. FIGS. 8 and 9 show aberrations at the wide-angle end and the telephoto end under such conditions. It is understood that aberrations are corrected desirably.

EXAMPLE 4

Figure 10A:
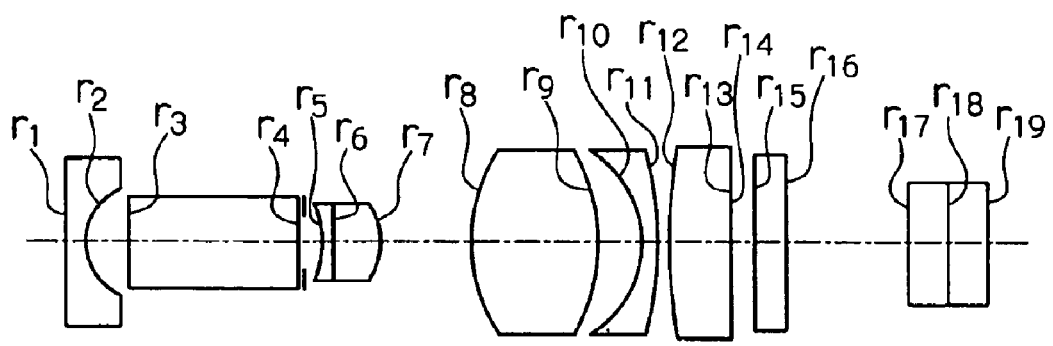
FIGS. 10A and 10B are cross sections for an objective optical system according to an embodiment 4 according to the present invention.
Figure 10B:
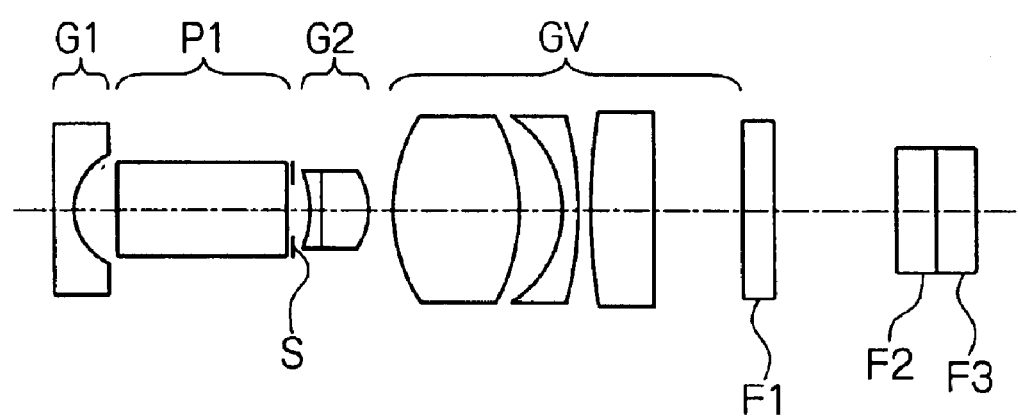

A structure for an example 4 is shown in FIGS. 10A and 10B. A wide-angle end is shown in FIG. 10A. A telephoto end is shown in FIG. 10B. Basic structure for lenses are the same as that in the example 1. FIGS. 11 and 12 show aberrations at the wide-angle end and the telephoto end under such conditions. It is understood that aberrations are corrected desirably.

EXAMPLE 5

Figure 13A:
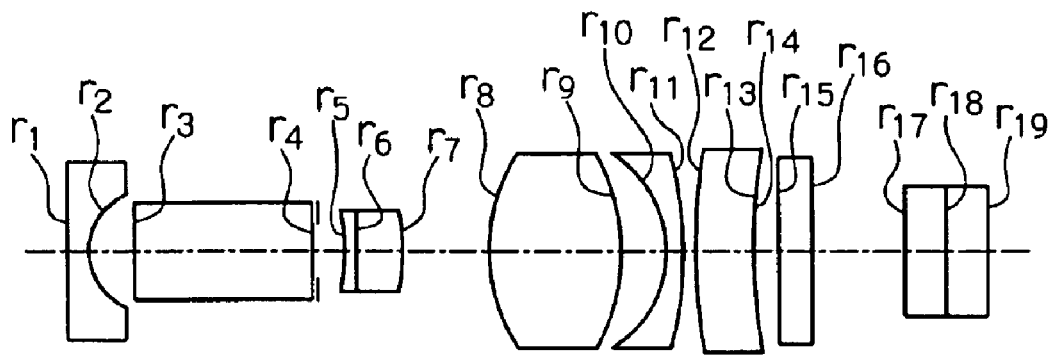
FIGS. 13A and 13B are cross sections for an objective optical system according to an embodiment 5 according to the present invention.
Figure 13B:
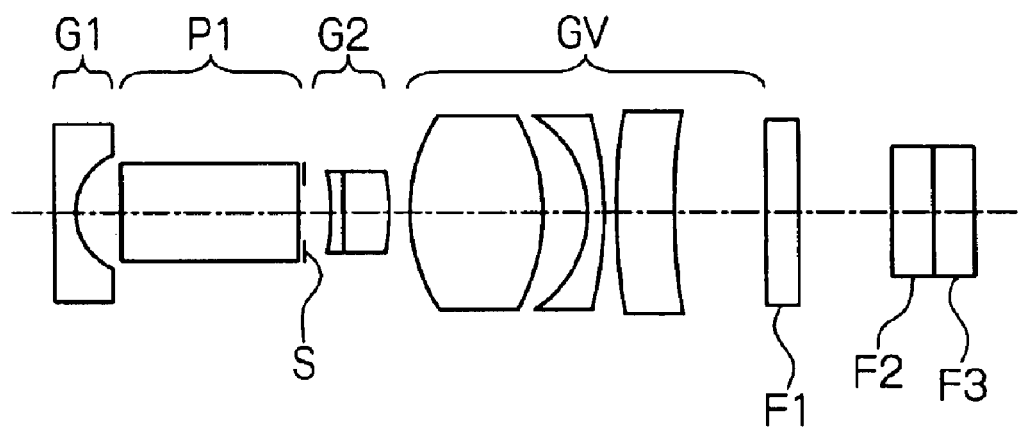
Figure 14:
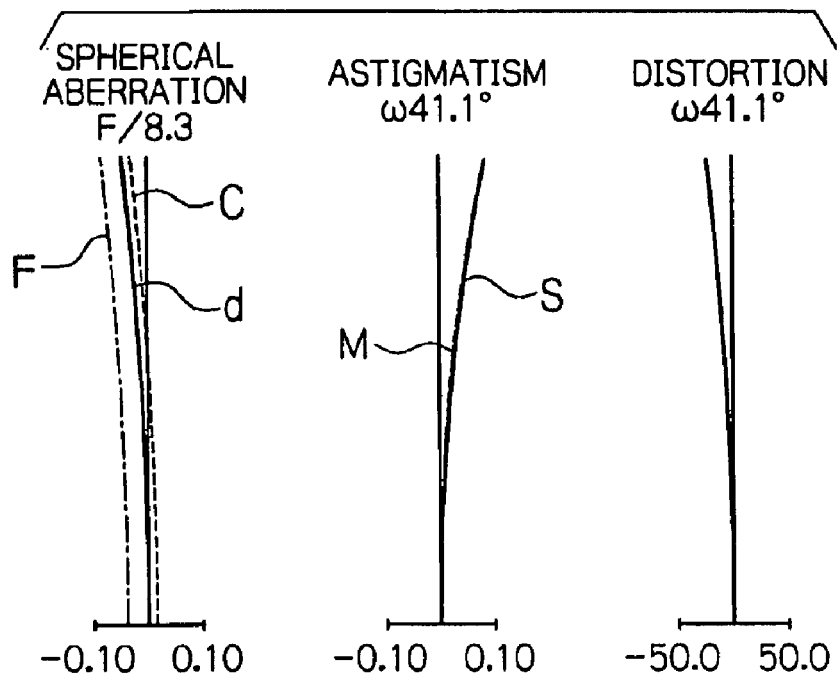
FIG. 14 is an aberration curve at the wide-angle end in the objective optical system according to the embodiment 5 according to the present invention.
Figure 15:
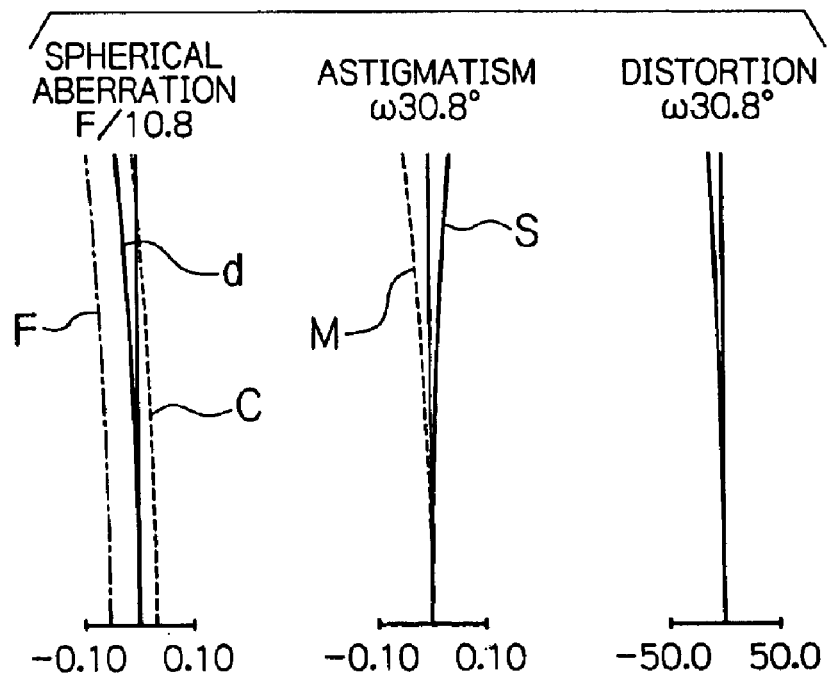
FIG. 15 is an aberration curve at the telephoto end in the objective optical system according to the embodiment 5 according to the present invention.

A structure for an example 5 is shown in FIGS. 13A and 13B. A wide-angle end is shown in FIG. 13A. A telephoto end is shown in FIG. 13B. Basic structure for lenses are the same as that in the example 1. FIGS. 14 and 15 show aberrations at the wide-angle end and the telephoto end under such conditions. It is understood that aberrations are corrected desirably.

EXAMPLE 6

Figure 16A:
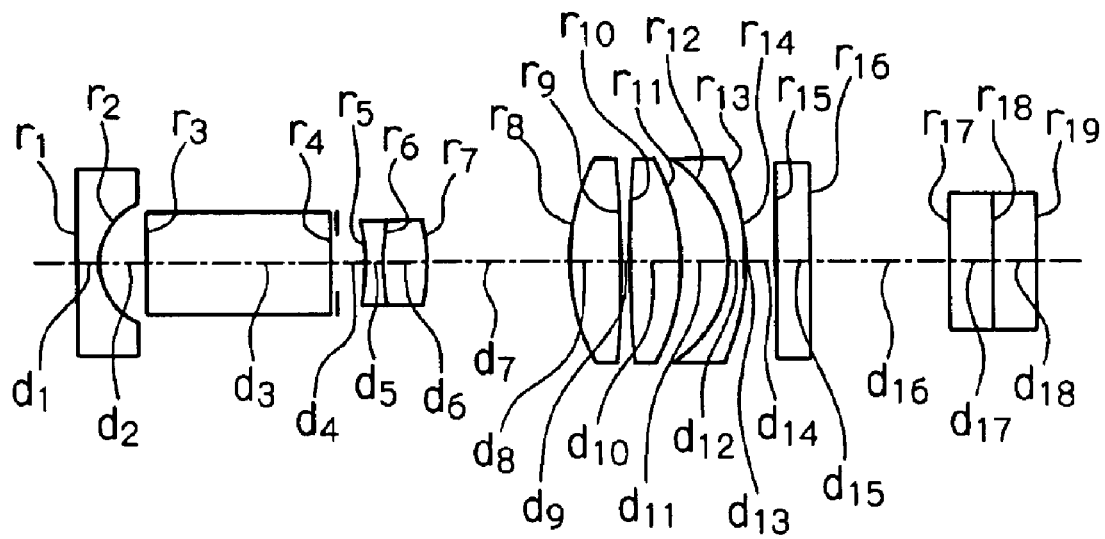
FIGS. 16A and 16B are cross sections for an objective optical system according to an embodiment 6 according to the present invention.
Figure 16B:
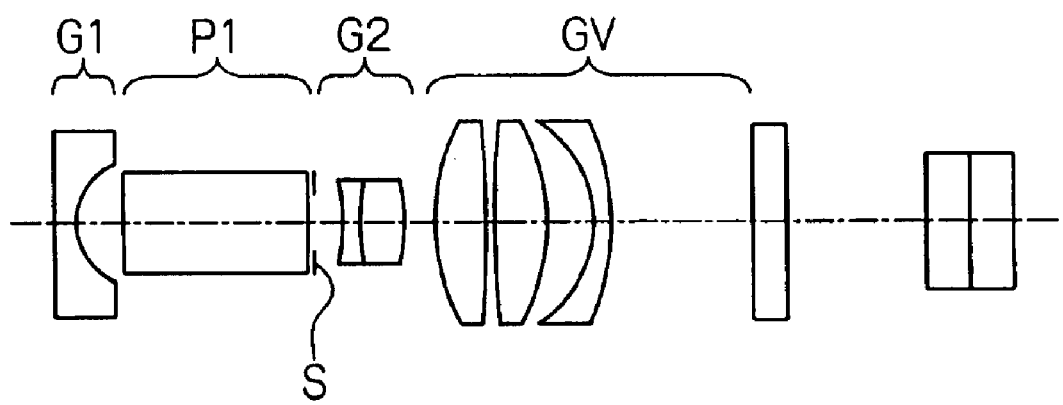
Figure 17:
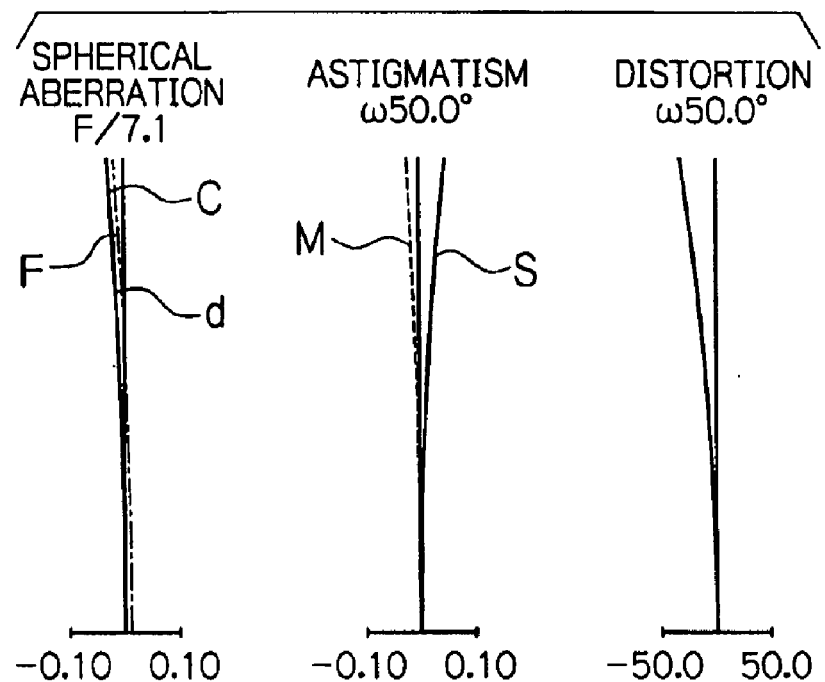
FIG. 17 is an aberration curve at the wide-angle end in the objective optical system according to the embodiment 6 according to the present invention.
Figure 18:
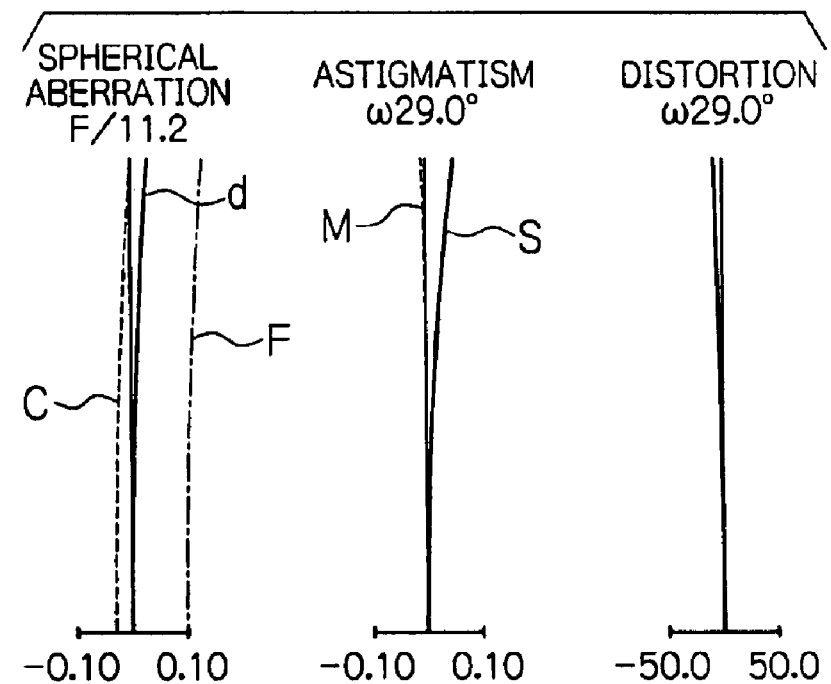
FIG. 18 is an aberration curve at the telephoto end in the objective optical system according to the embodiment 6 according to the present invention.

A structure for an example 6 is shown in FIGS. 16A and 16B. A wide-angle end is shown in FIG. 16A. A telephoto end is shown in FIG. 16B. Basic structure for lenses are the same as that in the example 1. FIGS. 17 and 18 show aberrations at the wide-angle end and the telephoto end under such conditions. It is understood that aberrations are corrected desirably.

EXAMPLE 7

Figure 19A:
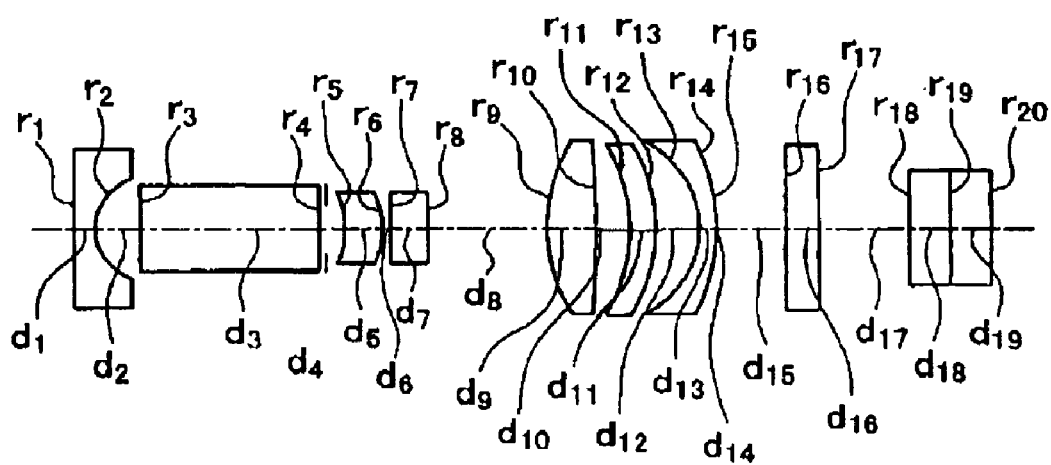
FIGS. 19A and 19B are cross sections for an objective optical system according to an embodiment 7 according to the present invention.
Figure 19B:
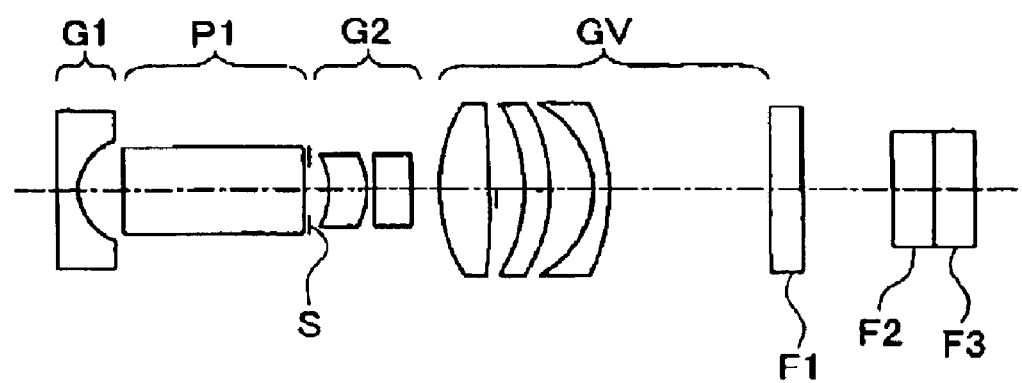
Figure 20:
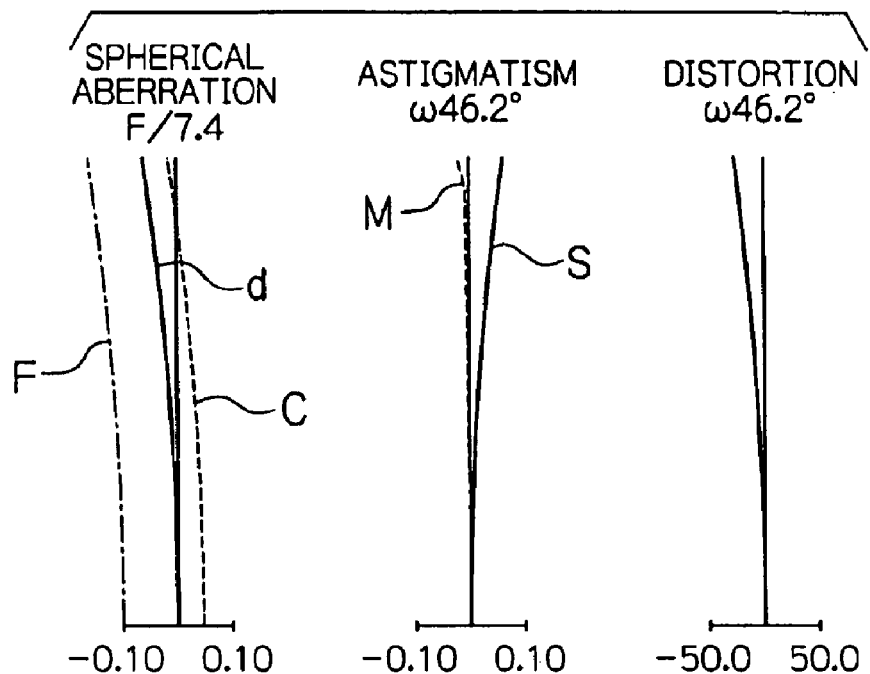
FIG. 20 is an aberration curve at the wide-angle end in the objective optical system according to the embodiment 7 according to the present invention.
Figure 21:
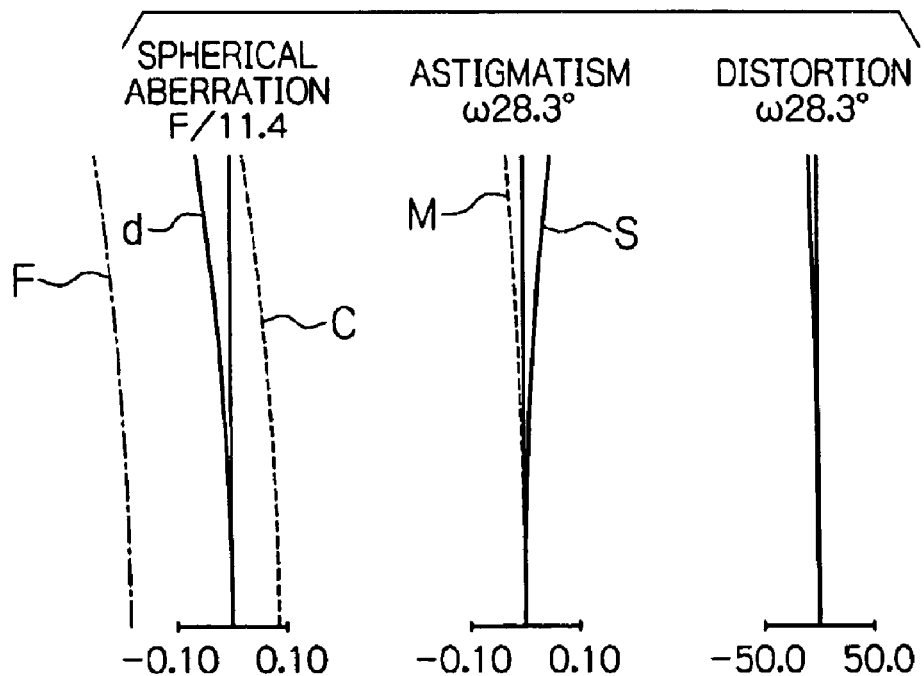
FIG. 21 is an aberration curve at the telephoto end in the objective optical system according to the embodiment 7 according to the present invention.

A structure for an example 7 is shown in FIGS. 19A and 19B. A wide-angle end is shown in FIG. 19A. A telephoto end is shown in FIG. 19B. Basic structure for lenses are the same as that in the example 1. FIGS. 20 and 21 show aberrations at the wide-angle end and the telephoto end under such conditions. It is understood that aberrations are corrected desirably.

Next, an operation in the objective optical system which has the above structure is explained.

Under condition that a back focus between the end surface near an image in the first lens group and the end surface near an object in the movable lens group is indicated by $D_L$ (mm), a focal length in an entire system at the wide-angle end is indicated by $f_W$ (mm), and a distance between the end surface near an object in the movable lens group and the front principal point is indicated by $D_{VH}$ (mm), a condition such as $2 \leq D_L/f_W \leq 6$ is satisfied. By doing this, a sufficient distance is obtained at the telephoto end in which a distance between the first lens group and the movable lens is the closest. By doing this, an optical axis direction converting element is disposed even at the telephoto end of the movable lens group; thus, a sufficient distance can be realized even in a small frame in which a diameter near the diaphragm is small.

However, if the $D_L/f_W$ is smaller than 2, it is not possible to secure a space for containing a frame in which the optical axis direction converting element and the diaphragm of which diameters are small thereabound. Also, if the $D_L/f_W$ is greater than 6, an unnecessary space exists which exceeds the above space. Therefore, an entire length of the optical system is long unnecessarily. Furthermore, a diameter of the second lens group is great undesirably.

Also, if a condition such as $-2 \leq D_{VH}/f_W \leq 0.37$ is satisfied and there exists quite a distance between the first lens group and the movable lens group, the position of the front principal point of the movable lens is disposed approximately the same position as the end surface near an object of the moving lens group or frontmore there. Therefore, a magnification at the telephoto end is great.

Here, in a basic structure, an entire moving lens group in the objective optical system according to the present invention has a positive refractive power so as to increase the magnification at the telephoto end such that the first lens group has a negative refractive power and the second lens group has a positive refractive power. By doing this, a position of the front principal point of the moving lens group is disposed approximately the same as the end surface near an object or frontmore there.

However, if $D_{VH}/f_W$ is smaller than −2, the negative refractive power in the moving lens group is too great; thus, a back focus is long. Therefore, an entire length of the optical system is long. Also, if $D_{VH}/f_W$ is greater than 0.37, it is difficult to increase the magnification at the telephoto end.

Here, a method for adjusting a position of an image by using the first lens group, the second lens group, and the moving lens group in the objective optical system according to the present invention is explained with reference to FIGS. 22A to 22D.

Figure 22A:
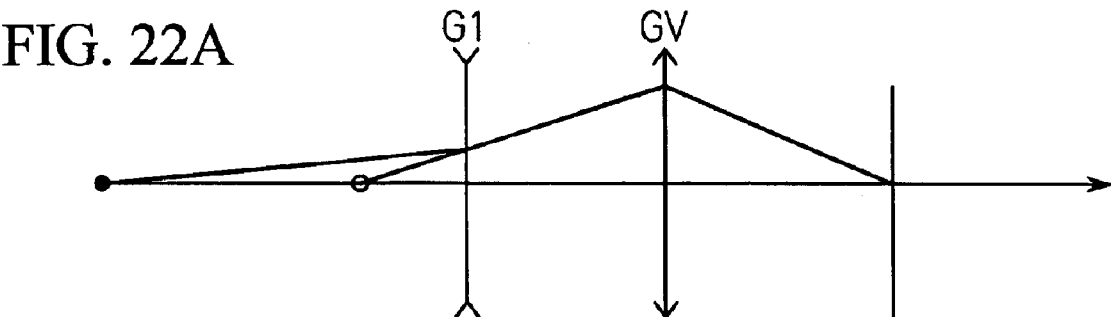
FIGS. 22A to 22D are view for explaining a method for adjusting positions for images by using the first lens group, the second lens group, and the moving lens group in the objective optical system according to the present invention.
Figure 22B:
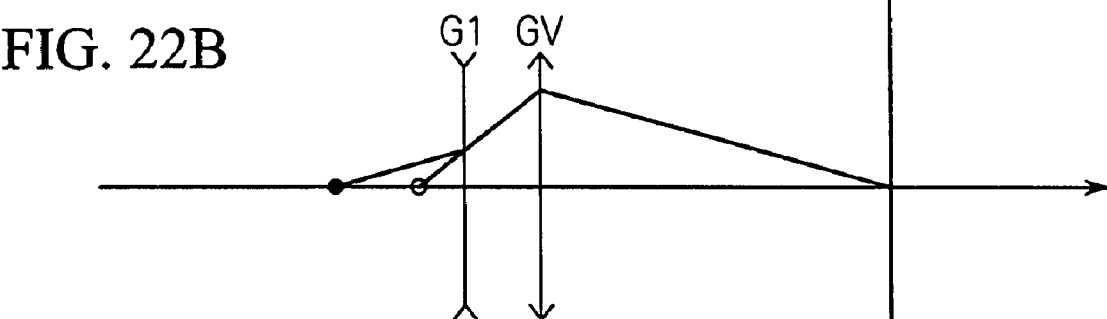

The moving lens group GV is moved from the wide-angle end for a distant object which is shown in FIG. 22A to the telephoto end for a close object which is shown in FIG. 22B according to the position of the object point in the objective optical system which is formed by the first lens group G1 which has a negative refractive power, the moving lens group GV which moves on the optical axis.

Figure 22C:
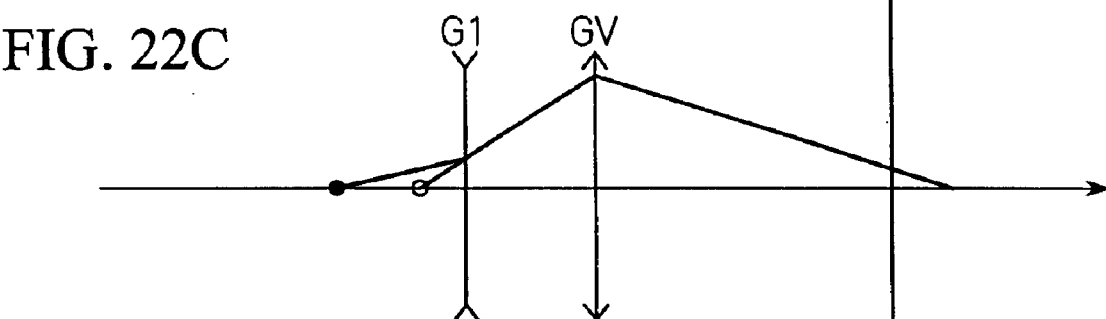

Furthermore, in this optical system, a higher optical magnification can be obtained if the moving lens group GV approaches closer to the first lens group G1. After that, if a distance between the moving lens group GV and the first lens group G1 increases as shown in FIG. 22C, the position of the object point moves nearer to the farther point in this optical system. Therefore, if an object point is disposed at the telephoto end as shown in FIG. 22B, it is certain that a position of an image is shifted undesirably.

Figure 22D:
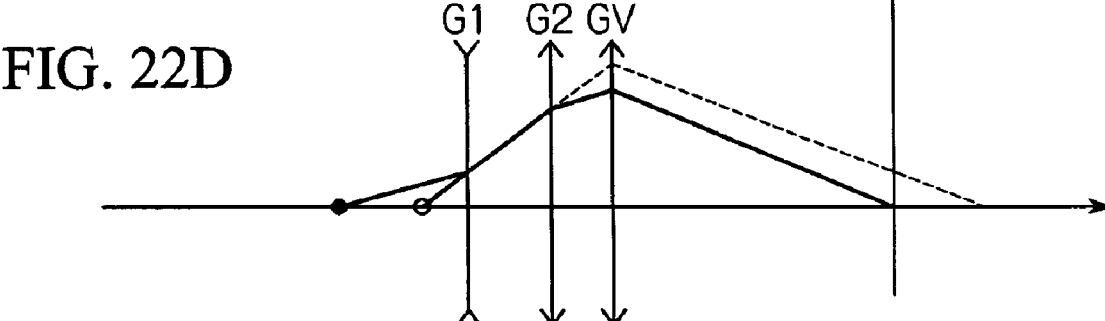

Here, as shown in FIG. 22D, a second lens group G2 which has a positive refractive power is disposed between the first lens group G1 and the moving lens group GV. By doing this, it is possible to adjust a position of the image in a position of an object point even if there is a certain distance between the moving lens group GV and the first lens group G1.

Also, the focal length $f_V$ of the moving lens group satisfies a condition such as $2.5 \leq f_V/f_W \leq 4$; therefore, the entire length of the objective optical system is shortened while obtaining a magnification at the telephoto end. However, if $f_V/f_W$ is smaller than 2.5, a back focus is too short to obtain an interval for adjusting a focus sufficiently. Also, if $f_V/f_W$ is greater than 4, an entire length of the objective optical system is long.

Also, the magnification $\beta_{VT}$ in an telephoto end of the moving lens group satisfies a condition such as $-1.2 \leq \beta_{VT} \leq -0.83$. By doing this, an optical magnification can be obtained at the telephoto end to which the distance to the object is the closest.

However, if the magnification $\beta_{VT}$ is smaller than −1.2, the distance to the object is more separated; thus, it is not possible to realize a magnification in an entire system. Also, if the magnification $\beta_{VT}$ is greater than −0.83, the magnification at the telephoto end of the moving lens group is small; thus, it is not possible to obtain a magnification in an entire system.

Here, a relationship between a position of object point and a focal length in an optical system which has two groups such as a negative group and a positive group such that a negative group is fixed and the positive group can be moved so as to change the magnification $\beta_2'$ for the latter group is explained for a simple understanding of the objective optical system according to the present invention. Here, it should be understood that only a positive group is movable such that an image surface is fixed in this objective optical system.

Figure 23:
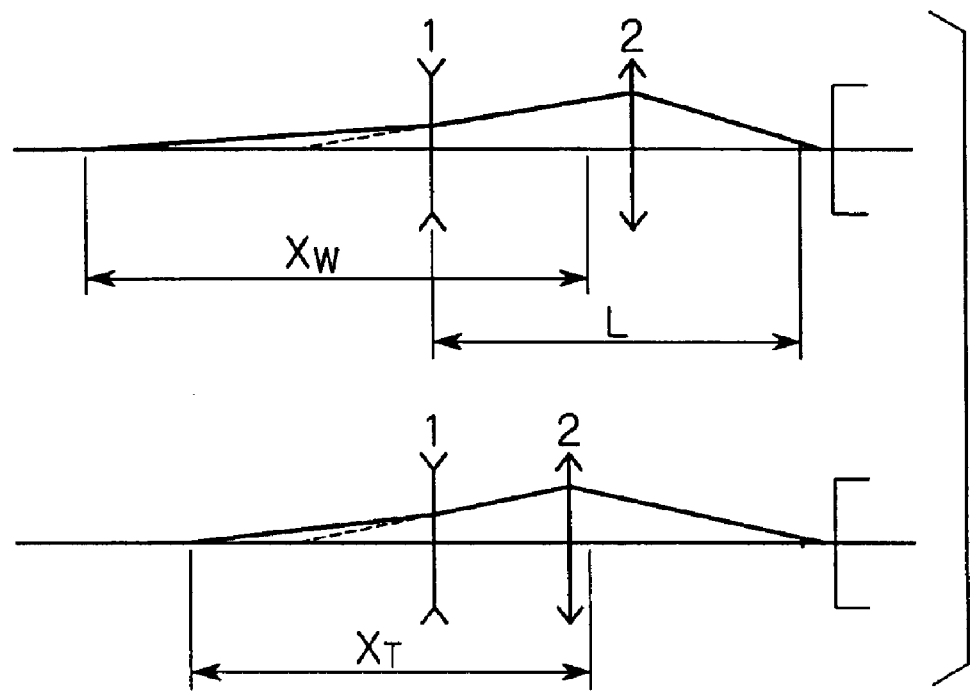
FIG. 23 is a view for explaining a relationship between a position to an object and the focal length.

In FIG. 23, reference numeral 1 indicates a negative lens system as a front group and reference numeral 2 indicates a positive lens group as a rear group. Also, under condition that F indicates a focal length of an entire system, $F_1$ indicates a focal length of a negative lens system as a front group, $F_2$ indicates a focal length of a positive lens system as a rear group, $\beta_1'$ indicates a magnification of a negative lens system as a front group for an observation at a wide-angle end, $\beta_2'$ indicates a magnification of a positive lens system as a rear group, and L indicates a distance between the negative lens system as a front group and a position of a focal point at a rear end of the entire system, F and L can be represented by formulae (1) and (2) as follows.

$$F = F_1 \beta_2' \qquad (1)$$

$$L = F_1(1-\beta_1') + F_2(2-\beta_2'-1/\beta_2') \qquad (2)$$

Here, if $\beta_2'$ is varied by moving the positive lens system as a rear group, the focal length F varies according to the formula (1). Thus, the entire length L varies according to the formula (2). The entire length L is the shortest under condition of $\beta_2' = -1$. That is, it is possible to obtain a distance of the object point which enables this optical system to approach the object which is supposed to be observed under condition that $\beta 2'=-1$.

If a distance between the position of the focal point in a front position of the negative lens system as a front group which has a random $\beta 2'$ and the object point is indicated by x, it is possible to determine x under condition that $\beta 2'$ is varied by setting $\beta_2'$ under a specific condition and moving the positive lens system as a rear group under such a condition.

Under condition that x is $x_W$ and the magnification satisfied a relation ship such as $\beta_2'=\beta_{2W}'$ for the rear group at the wide-angle end when the longest object point is observed and x is set, the x can be represented by a formula (3) below.

$$x=[(F_2/F_1{}^2)(\beta_{2w}'+1/\beta_{2w}'-\beta_2'-1/\beta_2')+1/x_w]^{-1} \quad (3)$$

Here, x is $x_{OW}$ under condition of $\beta_2'=-1$, $x_{OW}$ can be determined by a formula (4) below.

$$x_{Ow}=[1/xw+[F2/F12][2+\beta 2w'+1/\beta 2w']-1 \quad (4)$$

Figure 24:
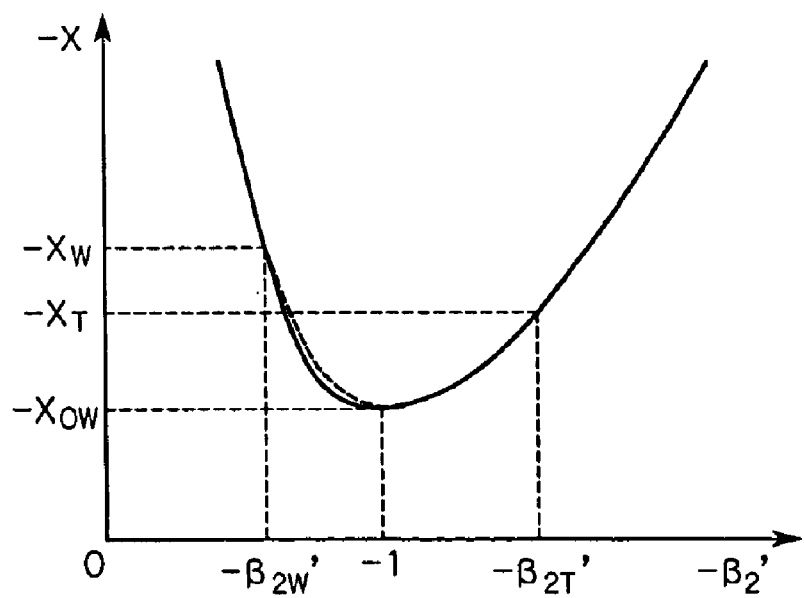
FIG. 24 is a view for explaining a relationship between a magnification of the objective optical system and the position to an object.

FIG. 24 is a graph which shows a relationship which is indicated by the formula (4). Here, a vertical axis is indicated by $-x$, and a horizontal axis is indicated by $-\beta_2'$. Here, $x_T$ is x under condition of a magnification satisfies a relationship $\beta_2'=\beta_2 T'$ for the positive lens system as a rear group at the telephoto end.

In the present invention, in order to accomplish a high magnification at the telephoto end, it is necessary to increase $\beta_2'$ and shorten the distance to the object compatibly as understood from a formula (5) below.

$$\beta=\beta_1'\beta_2' \quad (5)$$

Also, the moving lens group is provided with a lens which has at least a positive refractive power and a lens which has a negative refractive power in an order such that the lens which has the positive refractive power is disposed nearest to the tip section. Therefore, the moving lens group is disposed in an approximate telephoto manner; thus, the position of the front principal point is fed forwardly. Thus, it is possible to realize a high magnification at the telephoto end.

Also, the moving lens group has another lens which has a positive refractive power between the lens which has positive refractive power and the lens which has negative refractive power. Therefore, in a structural point of view, the moving lens group is disposed in an approximate telephoto manner such that the position of the front principal point is fed forwardly. Simultaneously, it is possible to disperse the refractive power by two lenses which has a positive refractive power. Thus, it is possible to increase a flexibility in a lens design for correcting aberrations.

Also, the air-converged length $D_A$ (mm) from the end surface near an image of the first lens group to a position of the diaphragm satisfies a condition such as 1.674 (mm) $\leq D_A \leq 4$ (mm). Therefore, a space in which the optical axis direction converting element is inserted is obtained. Thus, the image-capturing element such as a CCD can be downsized. Thus, even if a height of an image in the image-capturing element is small, the optical axis of that lens which has the positive refractive power is bent by the optical axis direction converting element so as to be formed inside of the endoscope.

However, if $D_A$ (mm) is smaller than 1.674 (mm), it is not possible to obtain a space in which the optical axis direction converting element is inserted. Also, if $D_A$ (mm) is greater than 4 (mm), an excessive space is obtained in a space in which the optical axis direction converting element is inserted; thus, such an excessive space affects a specification for an outer shape of the endoscope undesirably.

Also, a focal length $f_T$ (mm) in an entire system at a telephoto end satisfies a condition such as $2(1/mm) \leq D_L/(f_W \cdot f_T) \leq 4(1/mm)$. Therefore, the first lens group and the moving lens group approach with each other at the telephoto end; thus, the focal length in an entire system at the telephoto end is great. Therefore, it is possible to obtain a greater magnification more easily.

However, if $D_L/(f_W \cdot f_T)(1/mm)$ is smaller than $2(1/mm)$, it is not possible to obtain a space in which an optical axis direction converting element or a diaphragm infra-red ray cutting fiber should be disposed. Also, if $D_L/(f_W \cdot f_T)(1/mm)$ is greater than $4(1/mm)$, it is not possible to obtain a magnification at the telephoto end.

According to the above structures, it is possible to obtain a high magnification while realizing a sufficient distance between the diaphragm which is disposed behind the perspective-converting optical element such as a prism and the moving lens group.

Here, it is acceptable if an infra-red-ray-cutting filter may be disposed between the diaphragm and the moving lens group. An infra-red-ray-cutting filter is disposed between the diaphragm and the moving lens group; thus, an infra-red ray can be blocked while shortening an entire length of the objective optical system.

Also, it is acceptable if a prism may be disposed between the first lens group and the diaphragm.

A prism is disposed between the first lens group and the diaphragm. Thus, it is possible to perform a handling operation such as an assembly and a form modification for the prism. Therefore, it is possible to realize an objective optical system which is not costly.

Following effects can be realized in the above explained objective optical system according to the present invention.

According to the first aspect of the present invention, back focus between the end surface near an image in the first lens group and the end surface near an object in the movable lens group is indicated by $D_L$ (mm), a focal length in an entire system at the wide-angle end is indicated by $f_W$ (mm), and a distance between the end surface near an object in the movable lens group and the front principal point is indicated by $D_{VH}$ (mm); thus, a condition such as $2 \leq D_L/f_W \leq 6$ is satisfied. Therefore, a sufficient distance is obtained at the telephoto end in which a distance between the first lens group and the movable lens group. By doing this, an optical axis direction converting element is disposed even at the telephoto end of the movable lens group; thus, a sufficient distance can be realized even in a small frame in which a diameter near the diaphragm is small. Therefore, it is possible to obtain a high magnification while a sufficient distance is realized between the diaphragm which is disposed behind the perspective-converting optical element such as a prism and the moving lens group.

According to a second aspect of the present invention, the focal length $f_V$ (mm) of the moving lens group satisfies a condition such as $2.5 \leq f_V/f_W \leq 4$. By doing this, an entire length of the objective optical system can be shortened while a magnification is obtained at the telephoto end. Therefore, it is possible to obtain a high magnification while a sufficient distance is realized between the diaphragm which is disposed behind the perspective-converting optical element such as a prism and the moving lens group.

According to a third aspect of the present invention, a magnification $\beta_{VT}$ in an telephoto end of the moving lens group satisfies a condition such as $-1.2 \leq \beta_{VT} \leq -0.83$. By doing this, a sufficient optical magnification can be obtained at the telephoto end to which the distance to the object is the closest. Therefore, it is possible to obtain a high magnification while a sufficient distance is realized between the diaphragm which is disposed behind the perspective-converting optical element such as a prism and the moving lens group.

According to a fourth aspect of the present invention, the moving lens group is provided with, in an order from nearer the object, a lens which has at least a positive refractive power and a lens which has a negative refractive power. By doing this, the moving lens group is disposed in an approximate telephoto manner; thus, the position of the front principal point is fed forwardly. Thus, it is possible to realize a high magnification at the telephoto end.

According to a fifth aspect of the present invention, the moving lens group has another lens which has a positive refractive power between the lens which has positive refractive power and the lens which has negative refractive power. By doing this, the moving lens group has another lens which has a positive refractive power between the lens which has positive refractive power and the lens which has negative refractive power. Therefore, in a structural point of view, the moving lens group is disposed in an approximate telephoto manner such that the position of the front principal point is fed forwardly. Simultaneously, it is possible to disperse the refractive power by two lenses which has a positive refractive power. Thus, it is possible to increase a flexibility in a lens design for correcting aberrations. Therefore, it is possible to obtain a high magnification while realizing a sufficient distance between the diaphragm which is disposed behind the perspective-converting optical element and the moving lens group.

According to a sixth aspect of the present invention, the air-converged length $D_A$ (mm) from the end surface near an image of the first lens group to a position of the diaphragm satisfies a condition such as 1.674 (mm)$\leq D_A \leq$4 (mm). Therefore, a space in which the optical axis direction converting element is inserted is obtained. Thus, the image-capturing element such as a CCD can be downsized. Thus, even if a height of an image in the image-capturing element is small, the optical axis of that lens which has the positive refractive power is bent by the optical axis direction converting element so as to be formed inside of the endoscope. Therefore, it is possible to obtain a high magnification while realizing a sufficient distance between the diaphragm which is disposed behind the perspective-converting optical element and the moving lens group.

According to a seventh aspect of the present invention, an infra-red-ray-cutting filter is disposed between the diaphragm and the moving lens group. By doing this, an infra-red ray is blocked while shortening the entire length of the objective optical system. Thus, it is possible to obtain a high magnification while realizing a sufficient distance between the diaphragm which is disposed behind the perspective-converting optical element such as a prism and the moving lens group.

According to an eighth aspect of the present invention, a focal length $f_T$ (mm) in an entire system at a telephoto end satisfies a condition such as 2(1/mm)$\leq D_L/(f_W/f_T)\leq$4(1/mm). Therefore, the first lens group and the moving lens group approach with each other at the telephoto end; thus, the focal length in an entire system at the telephoto end is great. Therefore, it is possible to obtain a greater magnification more easily. Therefore, it is possible to obtain a high magnification while realizing a sufficient distance between the diaphragm which is disposed behind the perspective-converting optical element such as a prism and the moving lens group.

According to a ninth aspect of the present invention, a prism is disposed between the first lens group and the diaphragm. By doing this, it is possible to perform a handling operation such as an assembly and a form modification for the prism. Therefore, it is possible to realize an objective optical system which is not costly. Therefore, it is possible to obtain a high magnification while realizing a sufficient distance between the diaphragm which is disposed behind the perspective-converting optical element such as a prism and the moving lens group.

What is claimed is:

1. An objective optical system which is provided with, in a nearer order from its object, a first lens group which has a negative refractive power, a brightness diaphragm, and a second lens group which has a positive refractive power, and a moving lens group which moves on an optical axis; wherein conditions 2$\leq D_L/f_W\leq$6, and $-2\leq D_{VH}/f_W\leq$0.37 are satisfied under condition that $D_L$ (mm) indicates an air-converged length from an end surface near an image in the first lens group to an end surface nearer to an object in the moving lens group, $f_W$ (mm) indicates a focal length in an entire system in a wide angle end, $D_{VH}$ (mm) indicates a distance from the end surface near the object in the moving lens group to a front principal point.

2. An objective optical system according to claim 1 wherein the focal length $f_V$ (mm) of the moving lens group satisfies a condition 2.5$\leq f_V/f_W\leq$4.

3. An objective optical system according to claim 1 wherein a magnification $\beta_{VT}$ in an telephoto end of the moving lens group satisfies a condition $-1.2\leq\beta_{VT}\leq-0.83$.

4. An objective optical system according to claim 1 wherein the moving lens group is provided with, in an order from nearer the object, at least a lens which has a positive refractive power and a lens which has a negative refractive power.

5. An objective optical system according to claim 4 wherein the moving lens group has another lens which has a positive refractive power between the lens which has positive refractive power and the lens which has negative refractive power.

6. An objective optical system according to claim 1 wherein the air-converged length $D_A$ (mm) from the end surface near an image of the first lens group to a position of the diaphragm satisfies a condition 1.674(mm)$\leq D_A\leq$4 (mm).

7. An objective optical system according to claim 1 wherein an infra-red-ray-cutting filter is disposed between the diaphragm and the moving lens group.

8. An objective optical system according to claim 1 wherein a focal length $f_T$ (mm) in an entire system at a telephoto end satisfies a condition 2(1/mm)$\leq D_L/(f_W/f_T)\leq$4 (1/mm).

9. An objective optical system according to claim 1 wherein a prism is disposed between the first lens group and the diaphragm.

* * * * *